US012661892B2

(12) United States Patent
Kimura et al.

(10) Patent No.: US 12,661,892 B2
(45) Date of Patent: Jun. 23, 2026

(54) LIQUID EJECTION HEAD AND LIQUID EJECTION APPARATUS

(71) Applicant: CANON KABUSHIKI KAISHA, Tokyo (JP)

(72) Inventors: Satoshi Kimura, Kanagawa (JP); Takuya Iwano, Tokyo (JP); Takahito Kido, Kanagawa (JP); Klaas Verzijl, Venlo (NL)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 18/390,067

(22) Filed: Dec. 20, 2023

(65) Prior Publication Data

US 2024/0208222 A1 Jun. 27, 2024

(30) Foreign Application Priority Data

Dec. 23, 2022 (JP) ................................ 2022-207206

(51) Int. Cl.
*B41J 2/145* (2006.01)
*B41J 2/14* (2006.01)

(52) U.S. Cl.
CPC ................ *B41J 2/145* (2013.01); *B41J 2/14* (2013.01)

(58) Field of Classification Search
CPC ... B41J 2/145; B41J 2/14; B41J 2/1752; B41J 2/17503
See application file for complete search history.

(56) References Cited

U.S. PATENT DOCUMENTS 7,401,899 B2 7/2008 Nellen
2014/0362132 A1* 12/2014 Moreau ................ B41J 25/3082 347/2
2017/0087905 A1 3/2017 Ferrari
2021/0300094 A1* 9/2021 Tomioka .................. B41J 25/34

FOREIGN PATENT DOCUMENTS

JP 2006-188057 A 7/2006

OTHER PUBLICATIONS

Extended European Patent Search Report, dated May 7, 2024, in European Patent Application No. 23217401.1.

* cited by examiner

*Primary Examiner* — Jason S Uhlenhake
(74) *Attorney, Agent, or Firm* — Venable LLP

(57) ABSTRACT

A liquid ejection head and a liquid ejection apparatus that can suppress a deterioration of the printing quality include, as reference members, a first reference member and a second reference member that are provided at one end portion in a second direction crossing a first direction in which ejection ports are arrayed so as to be in different positions in the first direction, and a third reference member that is provided at the other end portion in the second direction so as to be between, in the first direction, the first reference member and the second reference member.

12 Claims, 28 Drawing Sheets

LIQUID EJECTION HEAD AND LIQUID EJECTION APPARATUS

BACKGROUND OF THE INVENTION

Field of the Invention

The present disclosure relates to a liquid ejection head and a liquid ejection apparatus.

Description of the Related Art

In recent years, in printing apparatuses for the use of professionals such as business use, commercial use, or industrial use, a configuration in which a liquid ejection head can be attached to and detached from a liquid ejection apparatus so as to be replaceable is applied in some cases. In this case, a simple replacement work is demanded in the replacement of the liquid ejection head. Additionally, the liquid ejection head needs to be positioned in the liquid ejection apparatus with very high accuracy to maintain higher printing quality. Japanese Patent Laid-Open No. 2006-188057 discloses a printing apparatus that has a configuration in which the liquid ejection head can be attached and detached and performs a method of positioning with high accuracy.

However, in the method of Japanese Patent Laid-Open No. 2006-188057, an orientation of the liquid ejection head is not fixed and is unstable in the positioning in which the liquid ejection head is directly supported by a support plate at two points. Therefore, there is a possibility that proper attachment is not achieved depending on an operation in the attaching. As a result, there is a possibility of a deterioration of the printing quality.

SUMMARY OF THE INVENTION

Therefore, the present invention provides a liquid ejection head and a liquid ejection apparatus that can suppress a deterioration of the printing quality.

To this end, a liquid ejection head of the present invention is characterized in that the liquid ejection head includes: an ejection element substrate in which multiple ejection ports ejecting a liquid are formed as an array in a first direction; a support member configured to support the ejection element substrate; and a reference member attached to the support member and configured to perform positioning of the ejection element substrate by putting a positioning unit in contact with a predetermined portion, in which the reference member is a first reference member and a second reference member that are provided at one end portion in a second direction crossing the first direction so as to be in different positions in the first direction, and is a third reference member that is provided at the other end portion in the second direction so as to be between, in the first direction, the first reference member and the second reference member.

According to the present disclosure, it is possible to provide a liquid ejection head and a liquid ejection apparatus that can suppress a deterioration of the printing quality.

Further features of the present invention will become apparent from the following description of exemplary embodiments with reference to the attached drawings.

DESCRIPTION OF THE EMBODIMENTS

Embodiments of the present invention are described below with reference to the drawings. Note that, the descriptions below are not intended to limit the scope of the present disclosure. For instance, although a method of ejecting a liquid by driving a piezoelectric element is described as an example in the present embodiment, a liquid ejection head employing a thermal method by which the liquid is ejected by an air bubble generated by a heater element and other various liquid ejection methods are also within the scope of application of the present disclosure. That is, the liquid ejection head may be a head including an arbitrary energy generation element.

The present embodiment may be an ink jet printing apparatus (a printing apparatus) in a mode of circulating the liquid such as ink between a tank and the liquid ejection head; however, another mode may be applicable. For example, a mode in which the ink is not circulated, and tanks are provided upstream and downstream the liquid ejection head, respectively, to flow the ink from one tank to the other tank so as to flow the ink in a pressure chamber may be applicable. Additionally, the apparatus according to the present disclosure is not limited to the printing apparatus that ejects the ink and may be a liquid ejection apparatus that ejects an arbitrary liquid.

Figure 1:
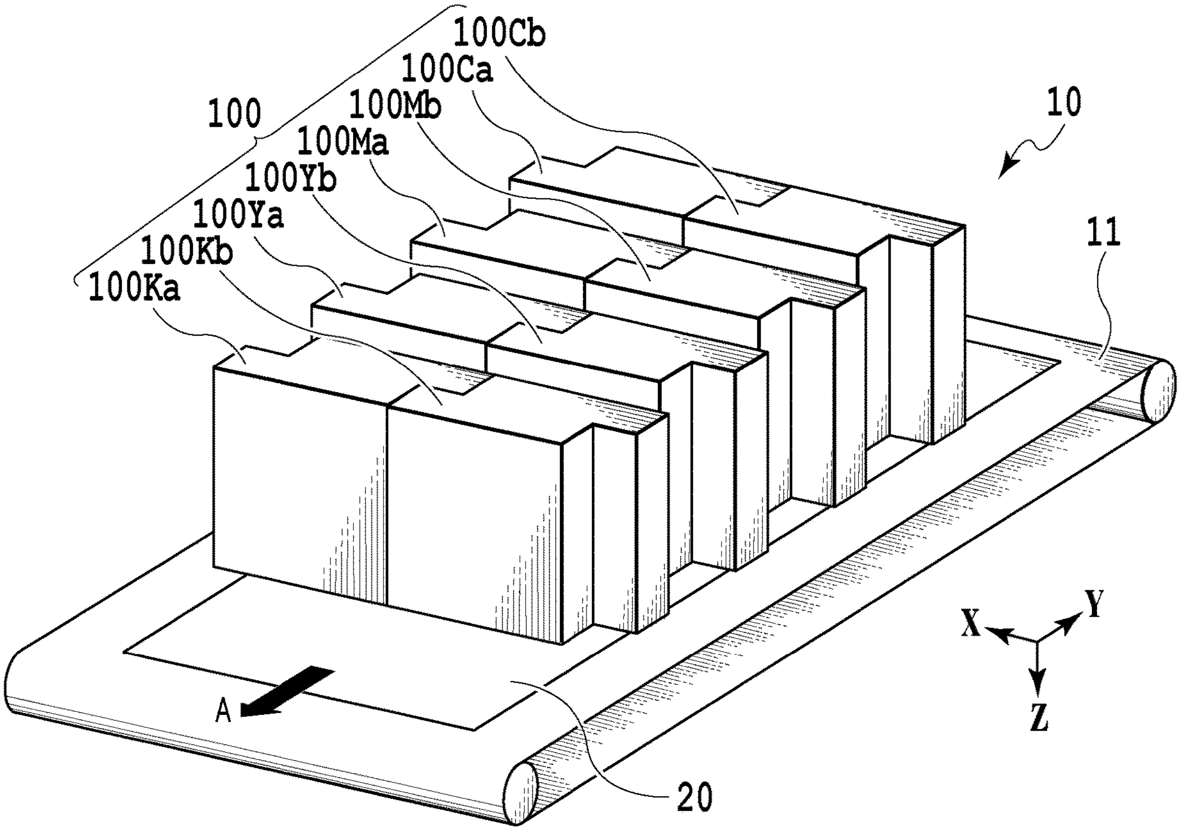
FIG. 1 is a schematic view illustrating an example of a liquid ejection apparatus.

FIG. 1 is a schematic view illustrating an example of a liquid ejection apparatus 10 of the present embodiment. The liquid ejection apparatus 10 includes a liquid ejection head 100, which is a so-called one-pass type that completes printing of an image of a predetermined region by moving a printing medium 20 once in a case of printing the image in the predetermined region of the printing medium 20. Ejection ports are arrayed in the liquid ejection head 100 over a range corresponding to an entire width (an X direction in FIG. 1) of the printing medium 20. The printing medium 20 is conveyed by a conveyance unit 11 in a direction of an arrow A, and printing is thus performed by the liquid ejection head 100. The liquid ejection head 100 of the present embodiment is the liquid ejection head 100 corresponding to four colors in total, which are cyan, magenta, yellow, and black. In more detail, two heads are provided for each color. Specifically, cyan heads 100Ca and 100Cb, magenta heads 100Ma and 100Mb, yellow heads 100Ya and 100Yb, and black heads 100Ka and 100Kb are provided. Hereinafter, one of those eight heads is focused on and described. Additionally, for the sake of simplifying the description, an arbitrary one of the heads is described as the liquid ejection head 100. Note that, the liquid ejection head of the present disclosure may be a head in an arbitrary mode and is not limited to the example illustrated in FIG. 1.

Moreover, in the present embodiment, a direction of ejecting the liquid (a direction of gravity) is described as a +Z direction, an upstream side in the conveyance direction of the printing medium 20 is described as a +Y direction, and an array direction in which the ejection ports are arrayed in the head is described as a +X direction.

Figure 2:
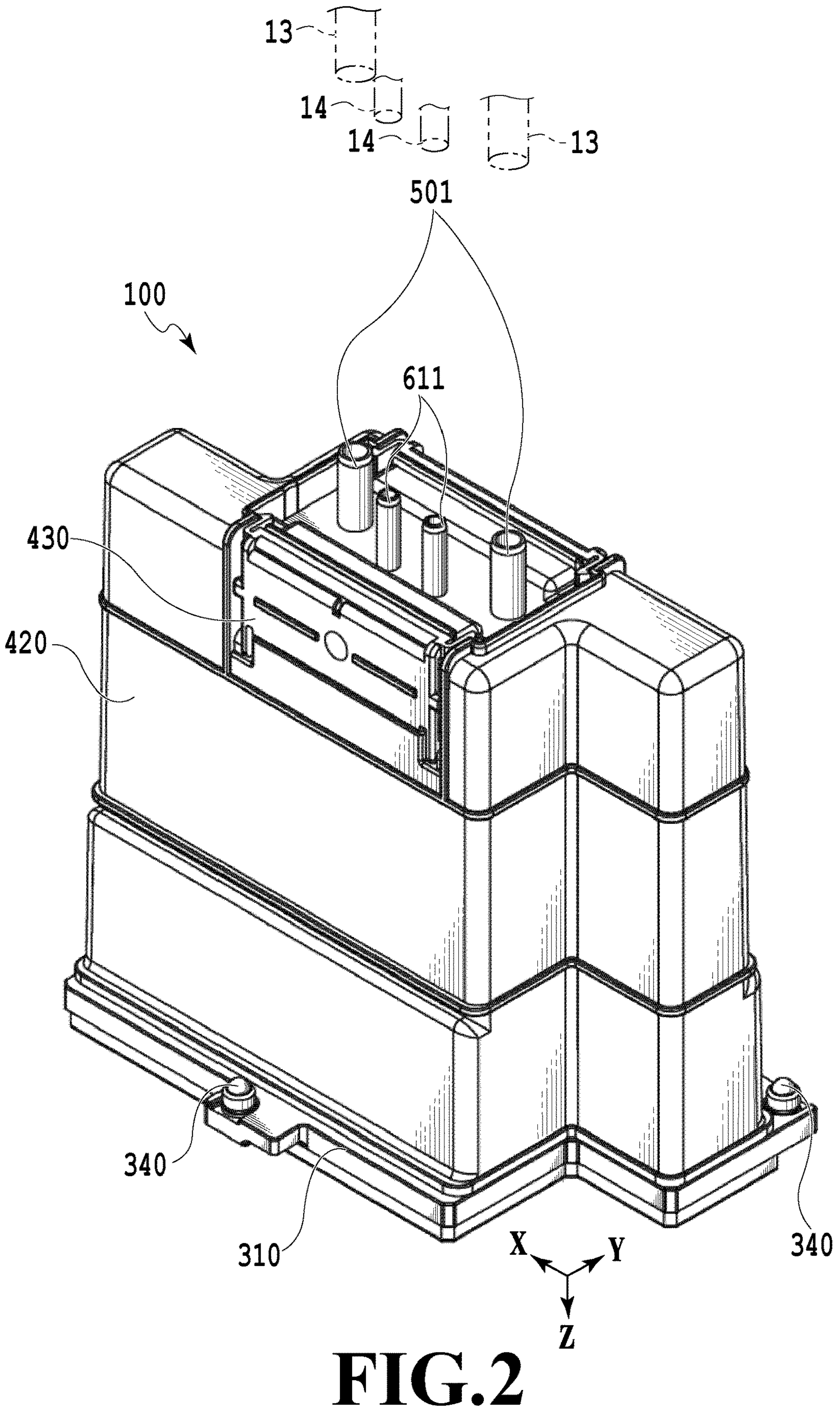
FIG. 2 is a perspective view of a liquid ejection head.
Figure 3:
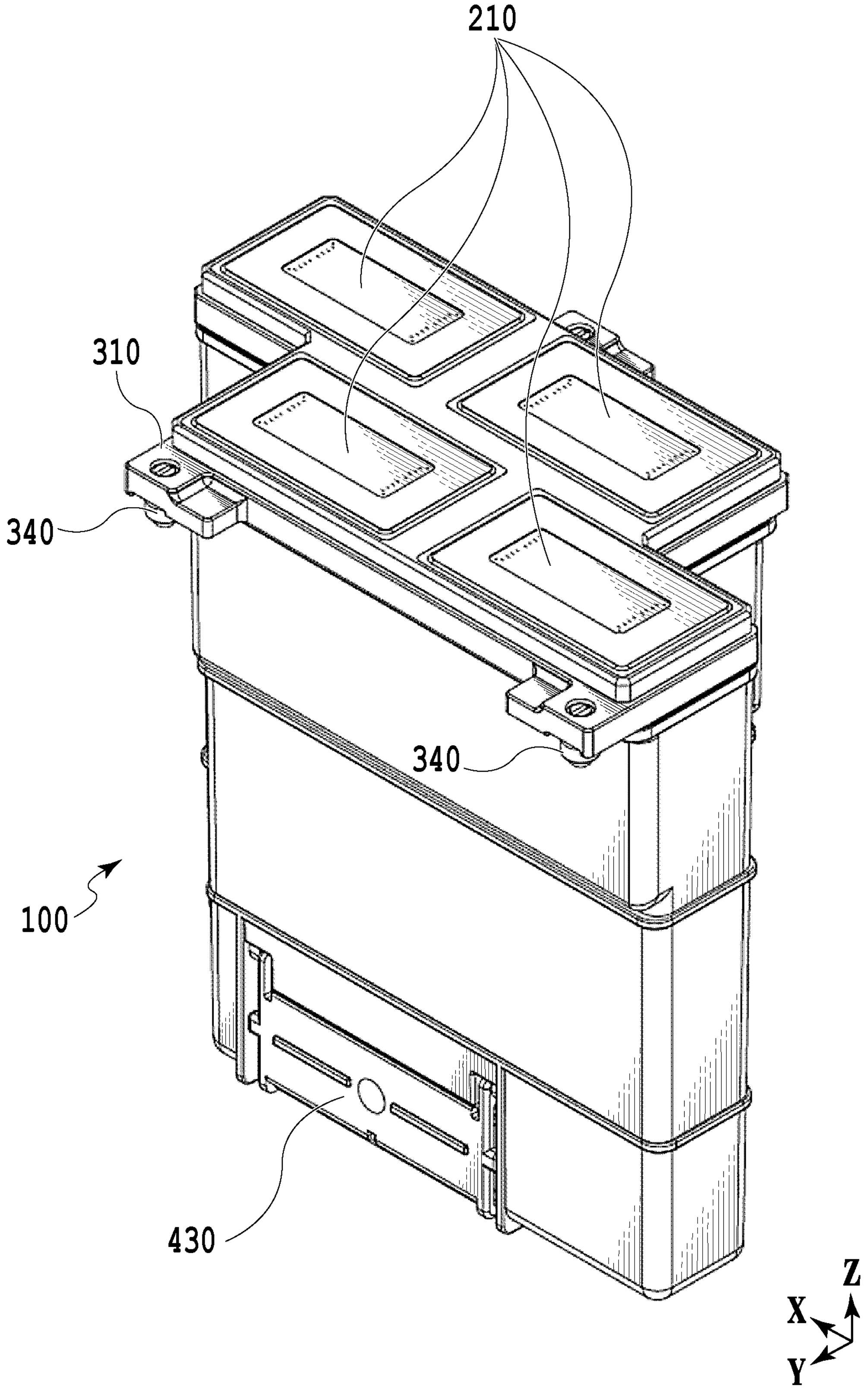
FIG. 3 is a perspective view of the liquid ejection head.
Figure 4:
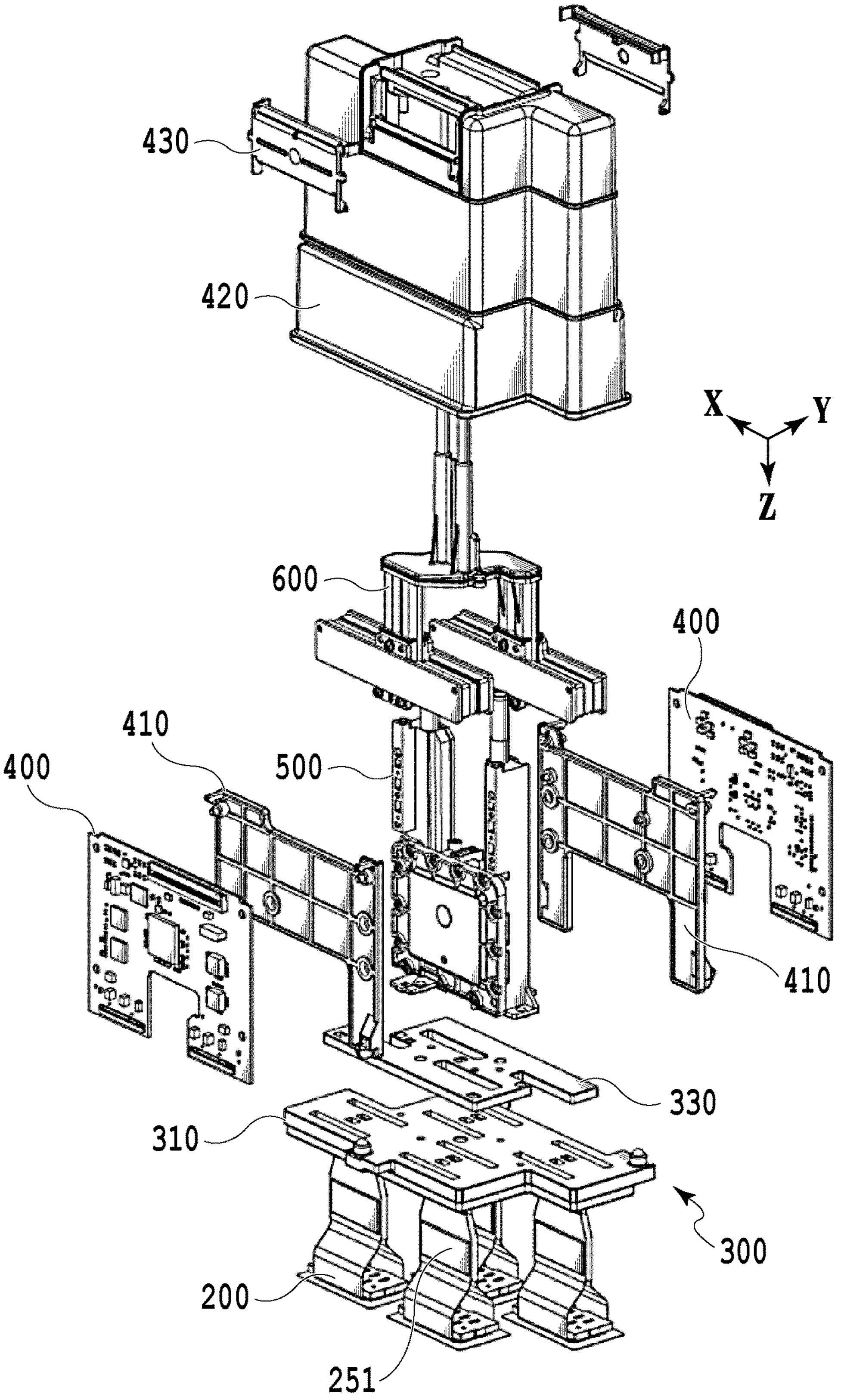
FIG. 4 is an exploded perspective view of the liquid ejection head.

FIG. 2 is a perspective view of the liquid ejection head 100 of the present embodiment. FIG. 3 is a perspective view of the liquid ejection head 100 of the present embodiment that is viewed from a different direction from that in FIG. 2. FIG. 4 is an exploded perspective view of the liquid ejection head 100 of the present embodiment. A configuration of the liquid ejection head 100 is described with reference to FIGS. 2 to 4. As described above, hereinafter, one of the eight heads illustrated in FIG. 1 is described as the liquid ejection head 100.

As illustrated in FIG. 3, the liquid ejection head 100 is a head in which four ejection element substrates 210, which can eject the liquid, are arrayed in a staggered pattern on a support member 310. The liquid ejection head 100 is positioned by a reference member 340 on a main body of the liquid ejection apparatus. As illustrated in FIG. 2, a liquid connection unit 501 and a refrigerant connection unit 611 are provided on the top of the liquid ejection head 100. The liquid connection unit 501 is connected to a liquid supply unit 13 on a liquid ejection apparatus main body side, and the refrigerant connection unit 611 is connected with a refrigerant supply unit 14 on the liquid ejection apparatus main body side. Thus, the liquid such as ink and a refrigerant are supplied into the liquid ejection head 100 from the liquid ejection apparatus main body.

A cover member 420 and an electric connection unit cover member 430 to cover an electric substrate, an electric connection unit, and the like for protection are provided to an exterior portion of the liquid ejection head 100. As illustrated in FIG. 4, the liquid ejection head 100 includes therein a support unit 300 including the support member 310, an electric wiring substrate 400, and an electric wiring substrate support member 410 holding the electric wiring substrate 400. Additionally, the liquid ejection head 100 includes a liquid supply unit 500 that supplies a liquid ejection unit 200 with the liquid through the support unit 300 and a cooling unit 600 that cools down a driving circuit. The liquid ejection head 100 includes multiple liquid ejection units 200, which are specifically four liquid ejection units 200. A configuration of each part of the liquid ejection head 100 is described below in detail.

Figure 5:
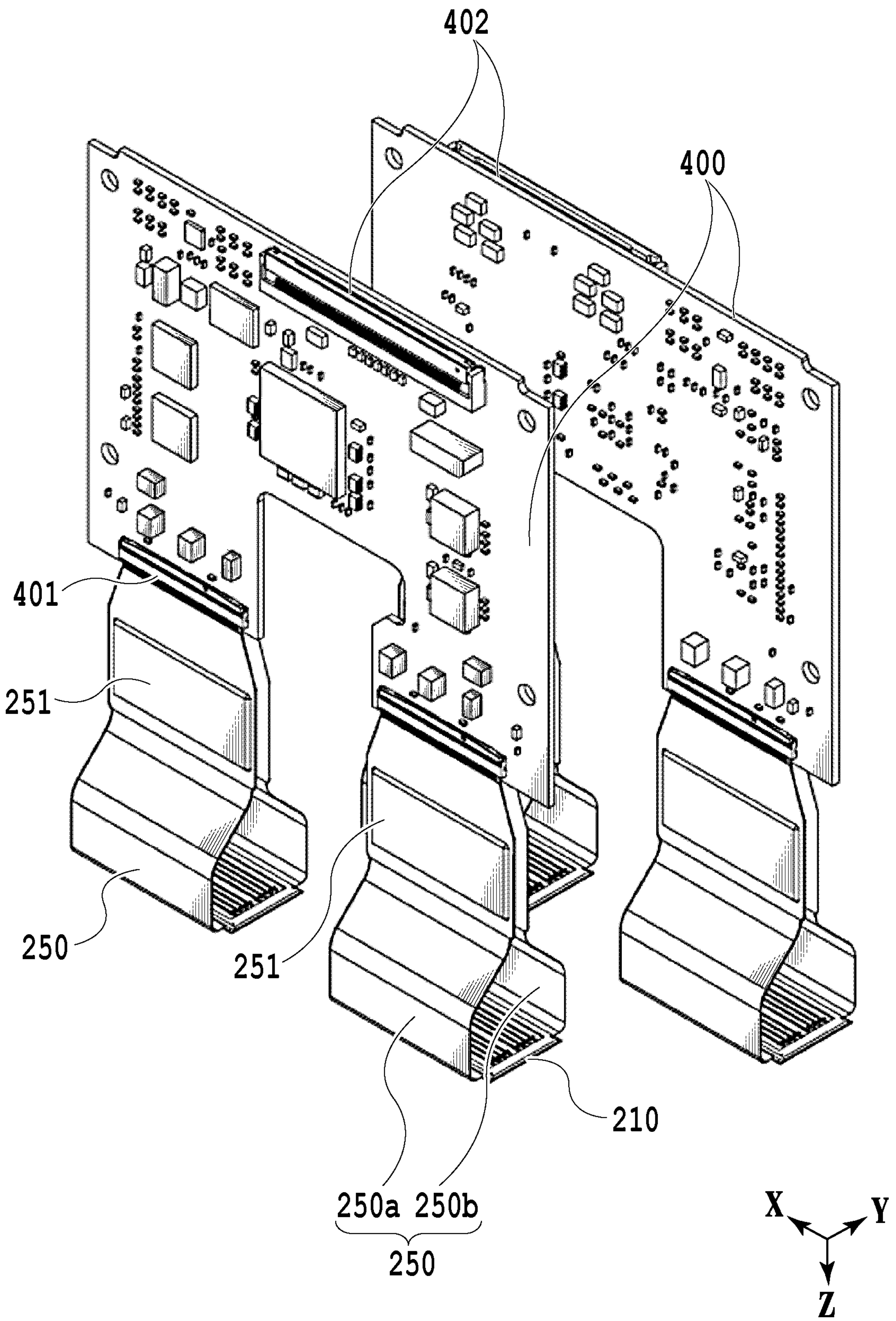
FIG. 5 is an electric connection configuration diagram of the liquid ejection head.

FIG. 5 is an electric connection configuration diagram of the liquid ejection head 100 of the present embodiment. The liquid ejection apparatus main body and the ejection element substrate 210 are electrically connected with each other through a flexible wiring substrate 250 and the electric wiring substrate 400. The electric wiring substrate 400 is electrically connected with a control unit (not illustrated) on the liquid ejection apparatus main body side by an electric connection terminal 402. The electric wiring substrate 400 is supplied with an ejection driving signal and power required for the ejection through the electric connection terminal 402. The electric wiring substrate 400 and the flexible wiring substrate 250 are electrically connected with each other by an electric connection unit 401. Wirings are concentrated by the electric circuit in the electric wiring substrate 400, and thus the terminal number of the electric connection terminals 402 can be less than the terminal number of the ejection element substrates 210. Therefore, there are a low number of the electric connection units that need to be detached in a case of assembling the liquid ejection head 100 on the liquid ejection apparatus or in a case of replacing the liquid ejection head 100. A driving circuit substrate 251 to drive the ejection element of the ejection element substrate 210 is provided on the flexible wiring substrate 250. The driving circuit substrate 251 includes a driving element to drive the ejection element. The ejection driving signal supplied to the electric wiring substrate 400 is inputted to the driving circuit substrate 251. The driving circuit substrate 251 performs driving control to drive each printing element according to the ejection driving signal. As illustrated in FIG. 5, in the present embodiment, one liquid ejection unit 200 includes two flexible wiring substrates 250, which are a first flexible wiring substrate **250*a* and a second flexible wiring substrate 250*b***. Note that, hereinafter, in a case where an individual flexible wiring substrate is described, the flexible wiring substrate is referred to as the first flexible wiring substrate

250*a* or the second flexible wiring substrate 250*b*, and in a case where a matter common to the two flexible wiring substrates is described, the two flexible wiring substrates are simply described as the flexible wiring substrate 250.

Figure 6:
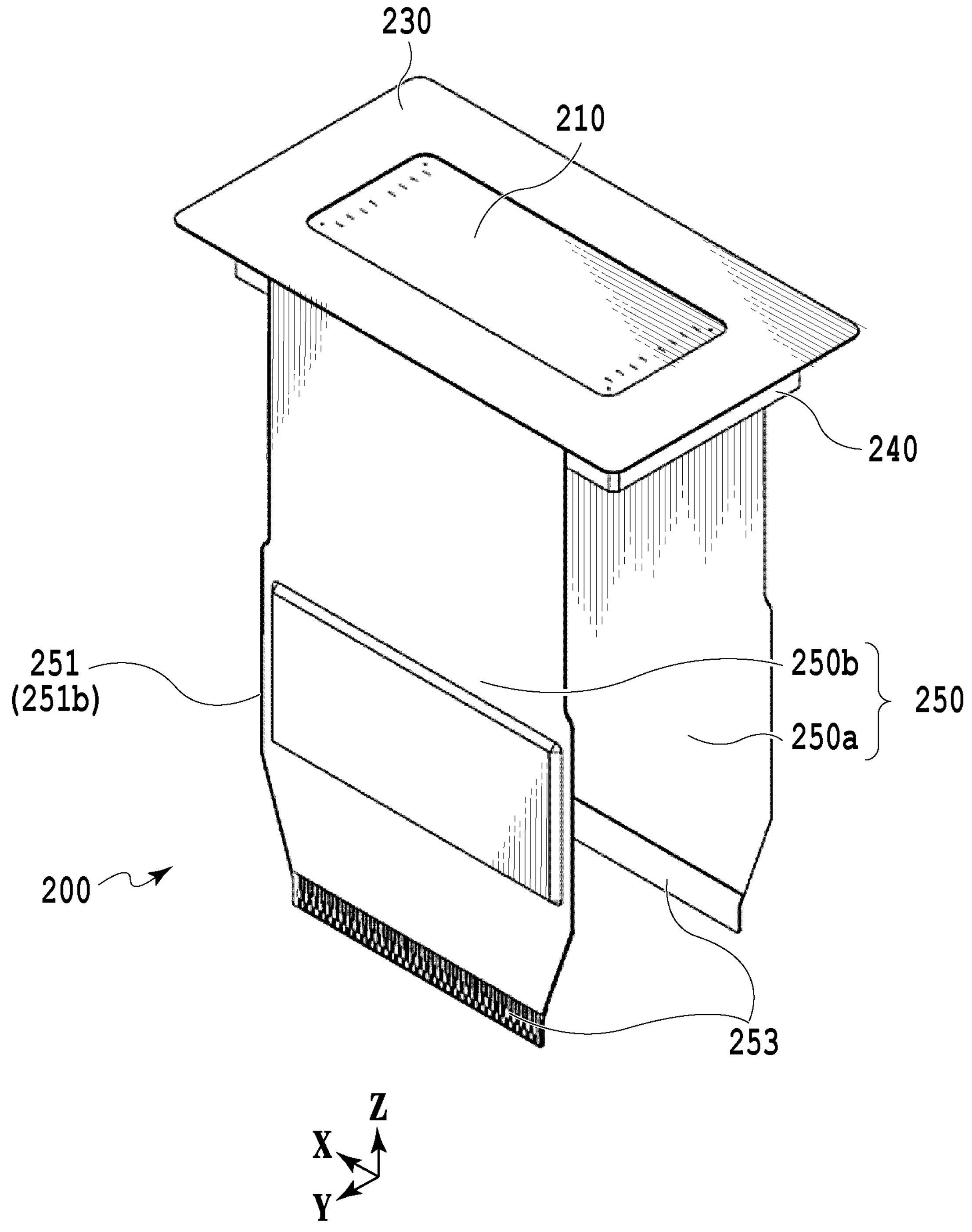
FIG. 6 is a perspective view of a liquid ejection unit.
Figure 7:
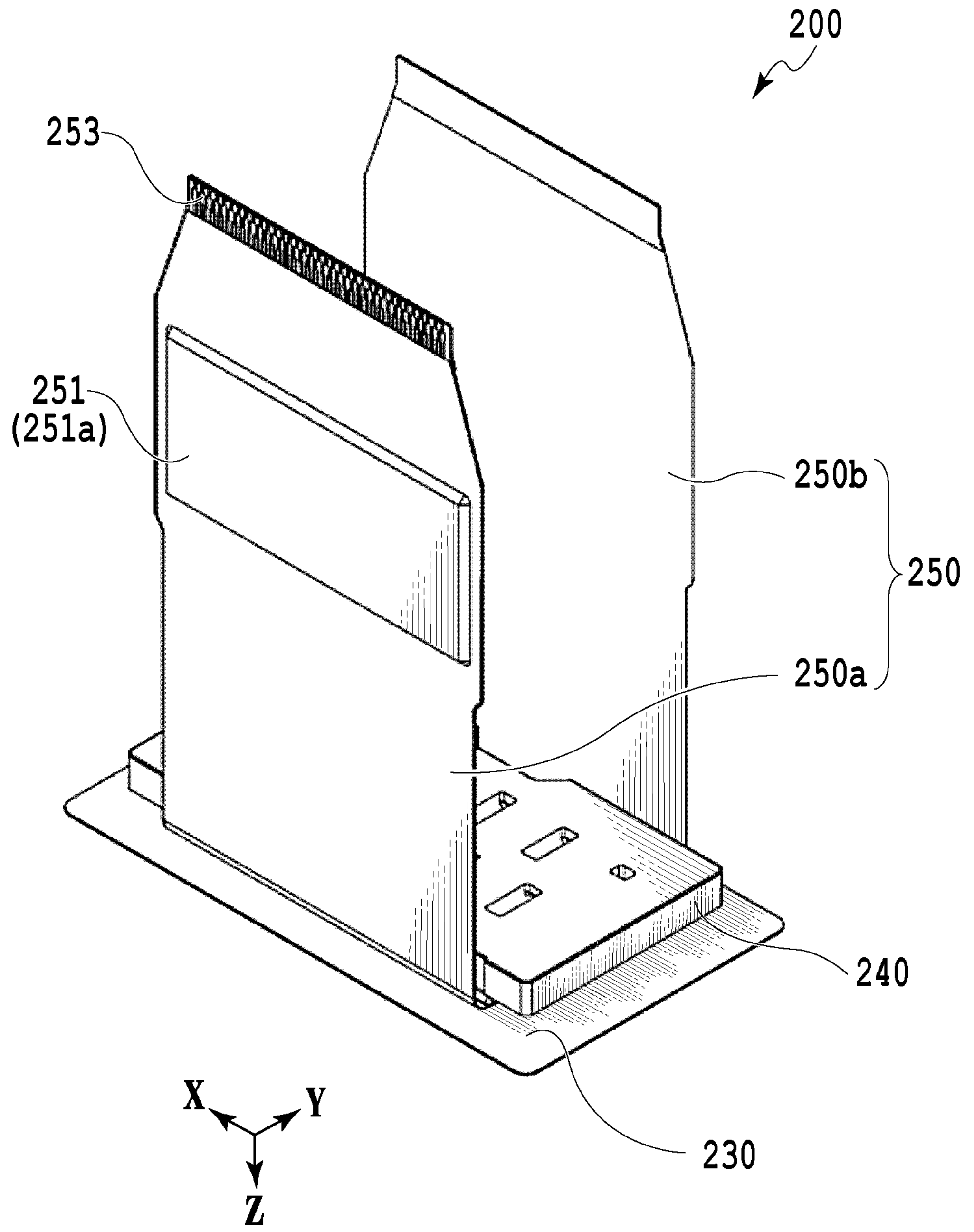
FIG. 7 is a perspective view of the liquid ejection unit.
Figure 8:
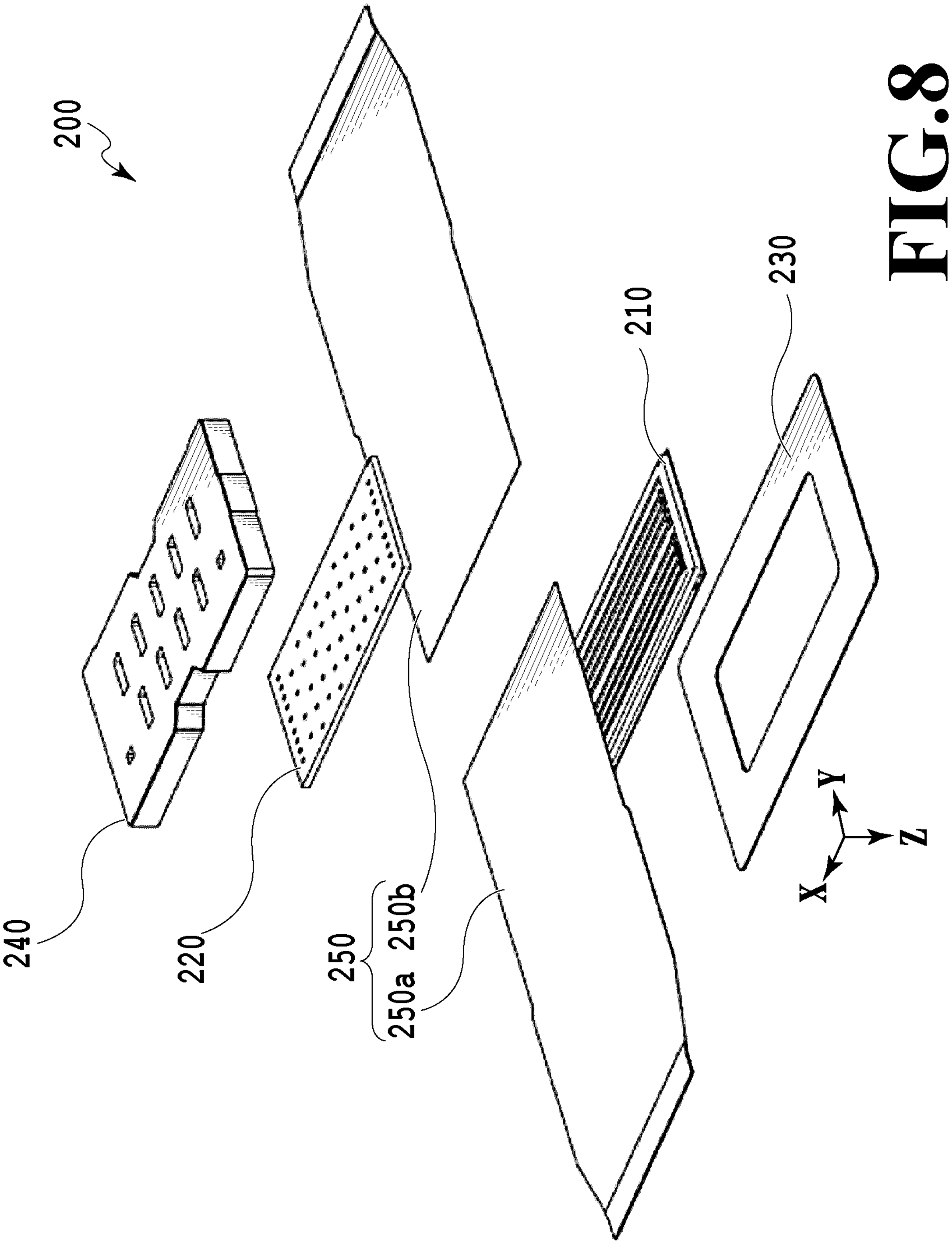
FIG. 8 is an exploded perspective view of the liquid ejection unit.
Figure 9:
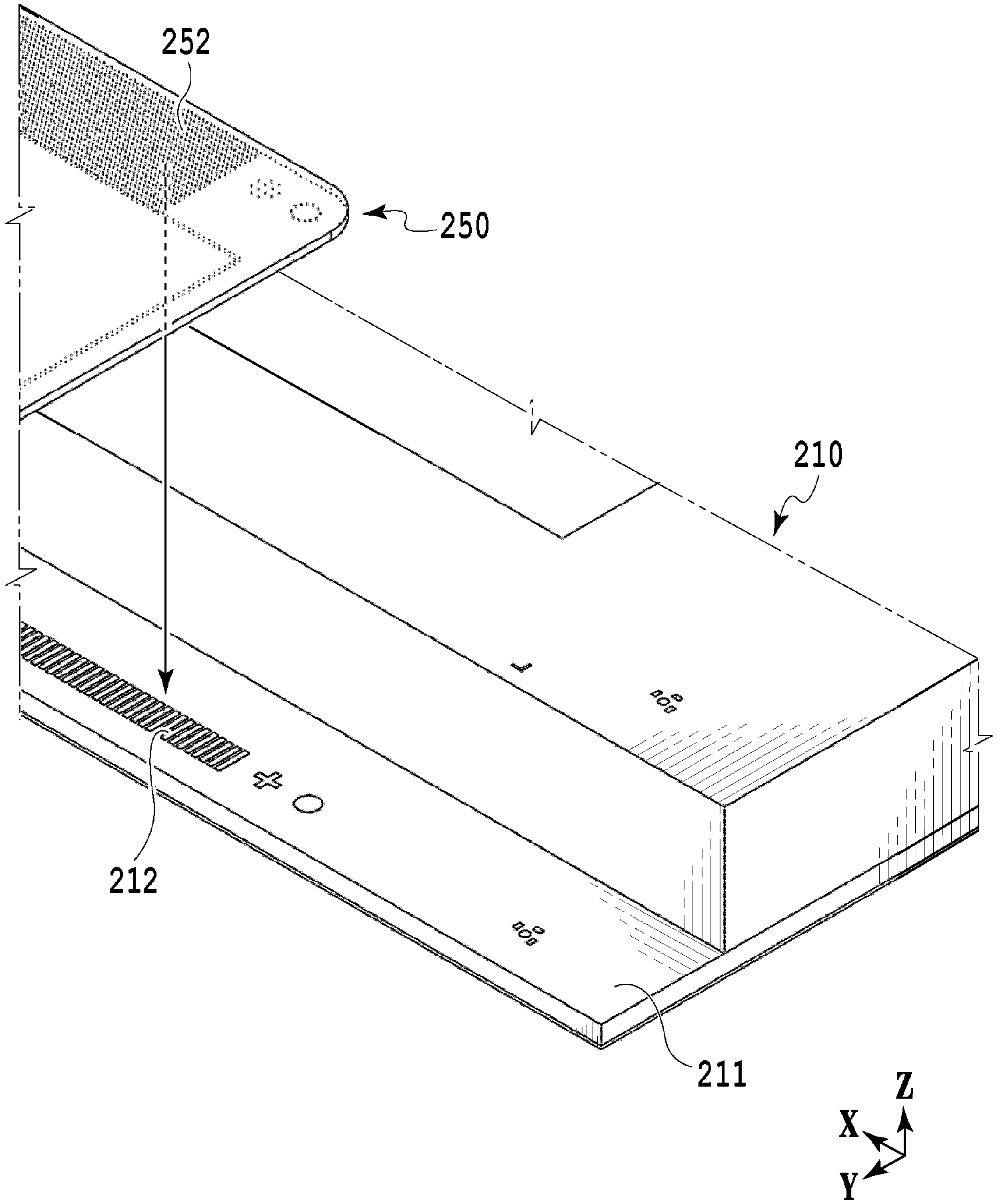
FIG. 9 is an enlarged view of an electrode unit of the liquid ejection unit.

FIG. 6 is a perspective view of the liquid ejection unit 200. FIG. 7 is a perspective view of the liquid ejection unit 200. FIG. 8 is an exploded perspective view of the liquid ejection unit 200. FIG. 9 is an enlarged view of an electrode unit of the liquid ejection unit 200. A configuration of the liquid ejection unit 200 is described below with reference to FIGS. 6 to 9.

As illustrated in FIGS. 6 to 8, the liquid ejection unit 200 includes the ejection element substrate 210 that ejects the liquid, an ejection element substrate flow channel member 220 that supplies the ejection element substrate 210 with the liquid, and a flow channel member 240 that supplies the ejection element substrate flow channel member 220 with the liquid. Additionally, the liquid ejection unit 200 includes the flexible wiring substrate 250 electrically connected with the ejection element substrate 210 and an ejection element substrate support member 230 joined on an ejection surface side of the ejection element substrate 210.

As illustrated in FIG. 9, an electrode unit 212 is provided on a thin plate unit 211 at each of two end portions of the ejection element substrate 210. FIG. 9 is an enlarged view of one end portion of the ejection element substrate 210. Note that, this end portion is an end portion in a direction crossing an array direction in which the ejection elements (or the ejection ports) are arrayed on the ejection element substrate 210. As illustrated in FIG. 9, the ejection element substrate 210 and the flexible wiring substrate 250 are electrically connected with each other by putting electrodes of the electrode unit 212 and a first electric connection unit 252 of the flexible wiring substrate 250 with each other. As illustrated in FIGS. 6 to 8, in order to suppress entering of the liquid to this electric connection unit and reinforce the thin plate unit 211 of the ejection element substrate 210, the ejection element substrate support member 230 is joined on an ejection surface side of the thin plate unit 211. The driving circuit substrate 251 to drive the ejection element of the ejection element substrate 210 is provided on the flexible wiring substrate 250 (see FIG. 5).

Figure 10:
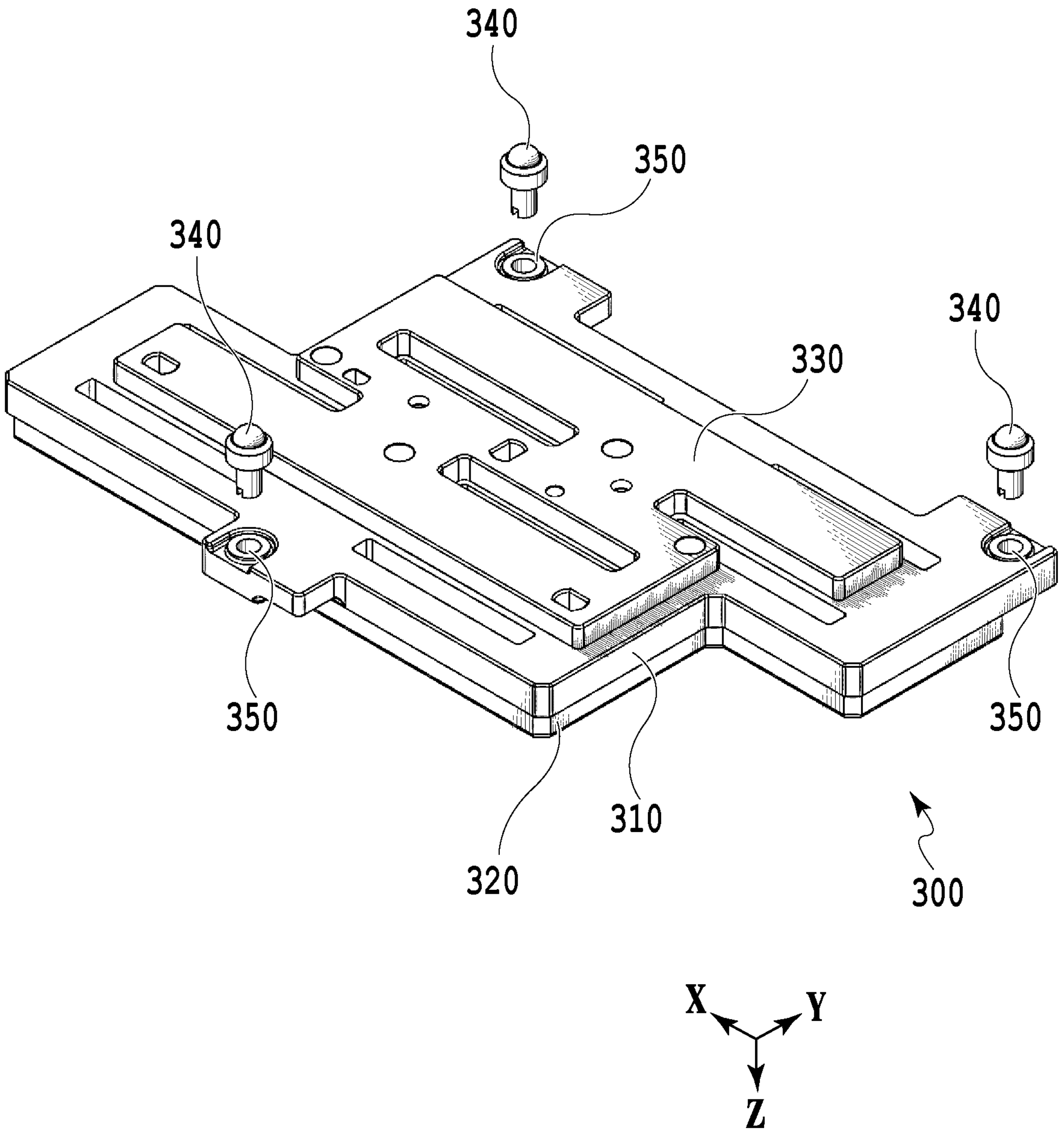
FIG. 10 is a perspective view of a support unit.

FIG. 10 is a perspective view of the support unit 300 that supports the liquid ejection unit 200. The support unit 300 includes the support member 310 onto which the liquid ejection unit 200 is joined and a frame body member 320 surrounding the liquid ejection unit 200. Additionally, the support unit 300 includes a liquid supply member 330 in which a flow channel that supplies each of the liquid ejection units 200 (in the present embodiment, the four liquid ejection units 200) with the liquid through the support member 310 is formed. Moreover, the support unit 300 includes the reference member 340 having a function of positioning between the liquid ejection head 100 and the liquid ejection apparatus main body and a reference fixation member 350 to fix the reference member 340 on the support member 310. It is preferable to select the same member for the support member 310, the frame body member 320, and the liquid supply member 330 in consideration of, for example, a thermal expansion effect in ink heating temperature adjustment or due to environmental variation. Otherwise, in a case where different types of members are used for the support member 310, the frame body member 320, and the liquid supply member 330, it is preferable to select members with a linear coefficient of expansion as close to each other as possible. Therefore, it is possible to suppress deformation of the whole support unit in the thermal expansion and accordingly a deterioration in a position accuracy of the ejection element substrate 210.

Figure 11:
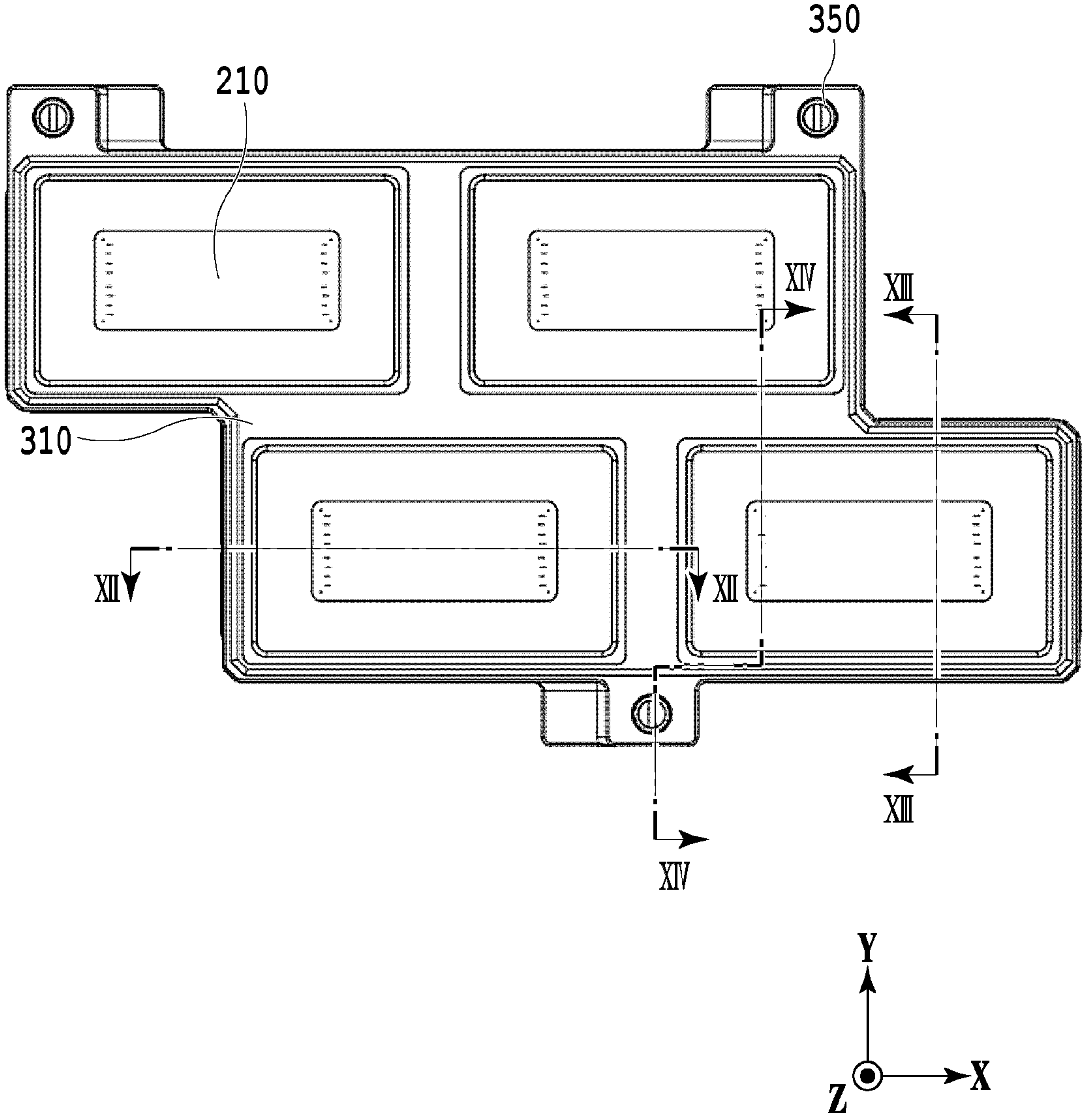
FIG. 11 is a plan view of the liquid ejection head assembled on the support unit that is viewed from an ejection surface side.
Figure 12:
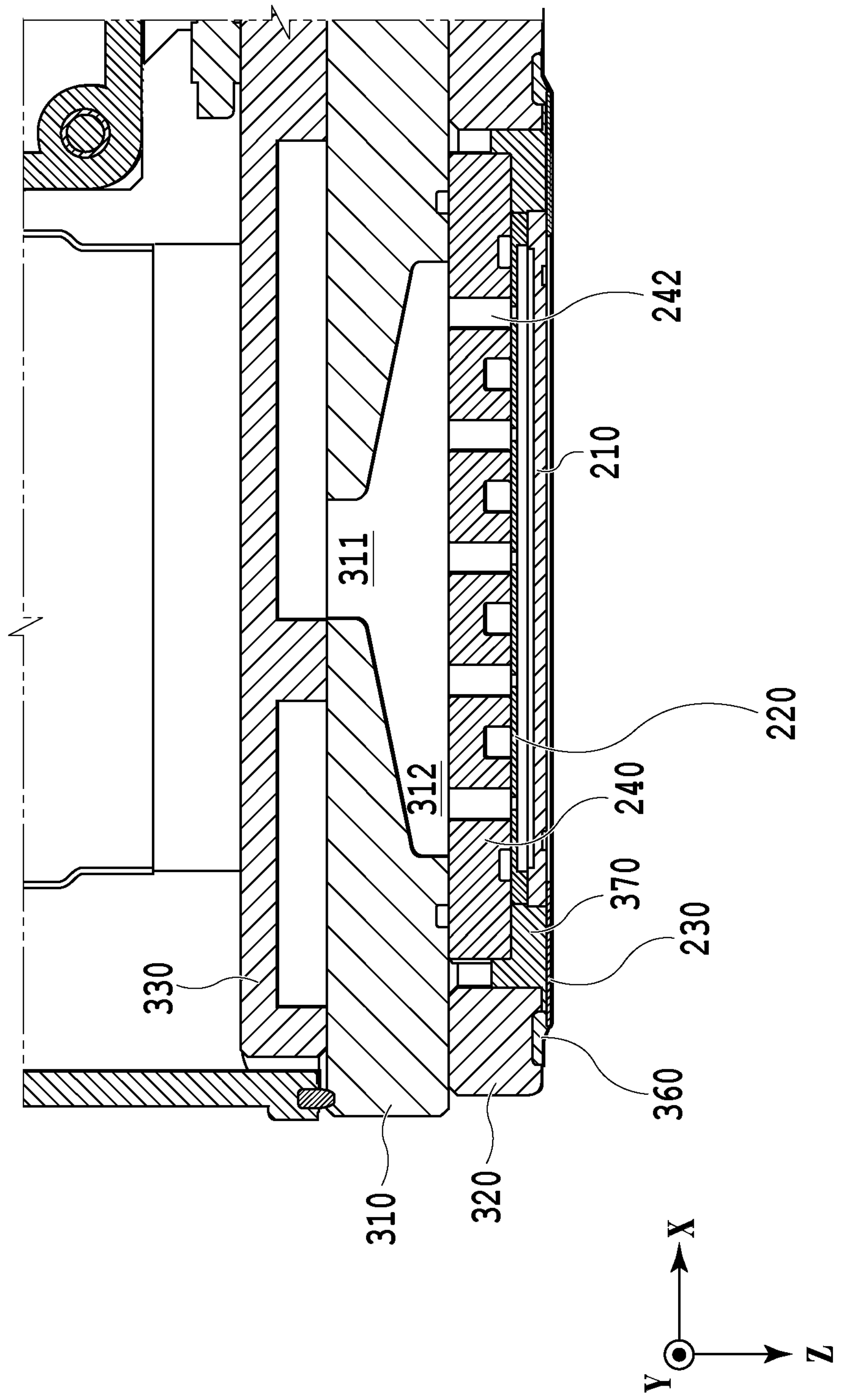
FIG. 12 is a cross-sectional view taken along XII-XII in FIG. 11.
Figure 13:
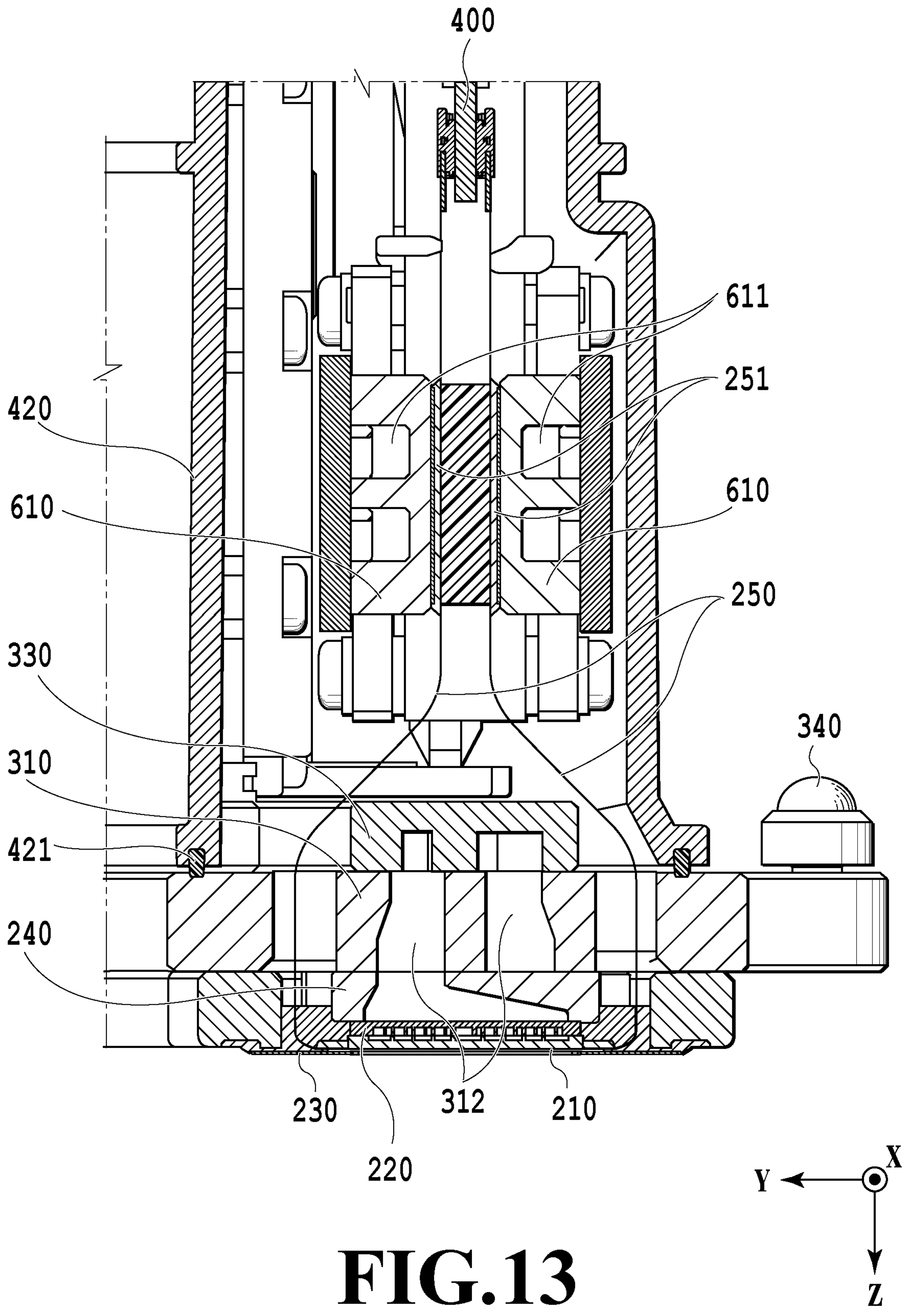
FIG. 13 is a cross-sectional view taken along XIII-XIII in FIG. 11.
Figure 14:
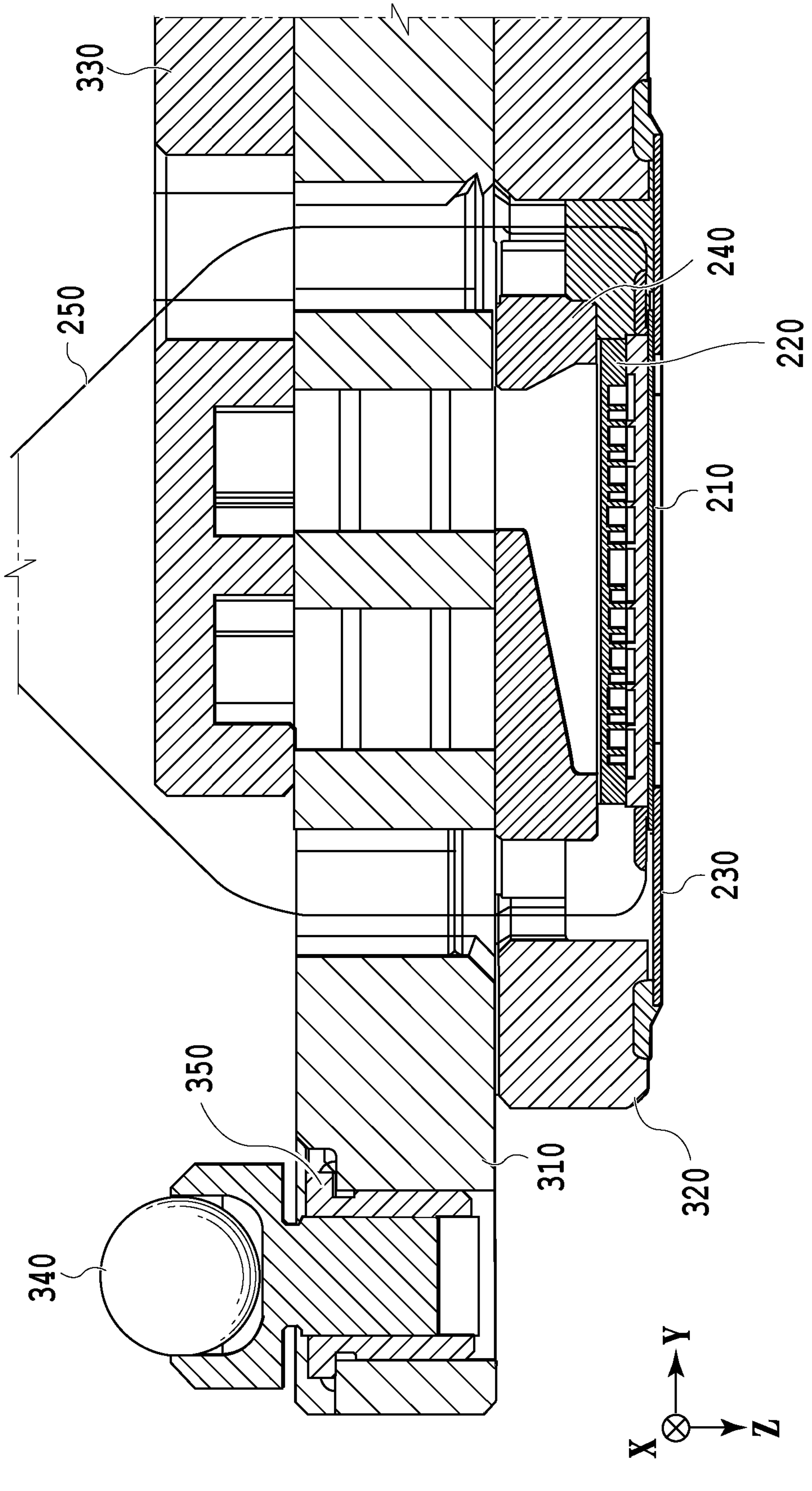
FIG. 14 is a cross-sectional view taken along XIV-XIV in FIG. 11.
Figure 15A:
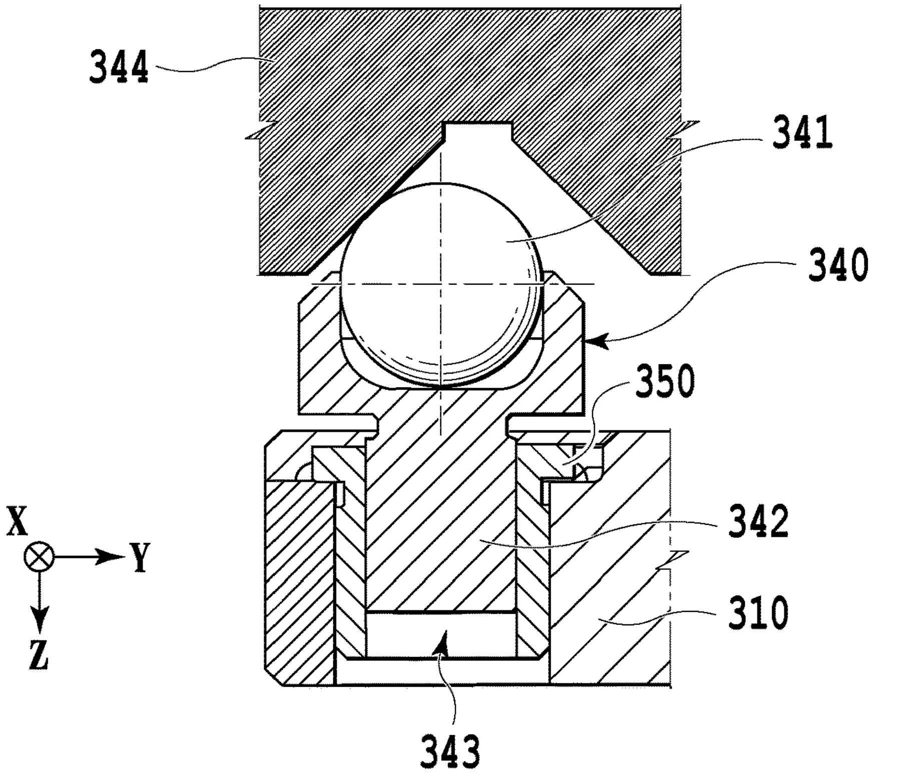
FIG. 15A is a cross-sectional view illustrating a reference member and a positioning member of the liquid ejection head.
Figure 15B:
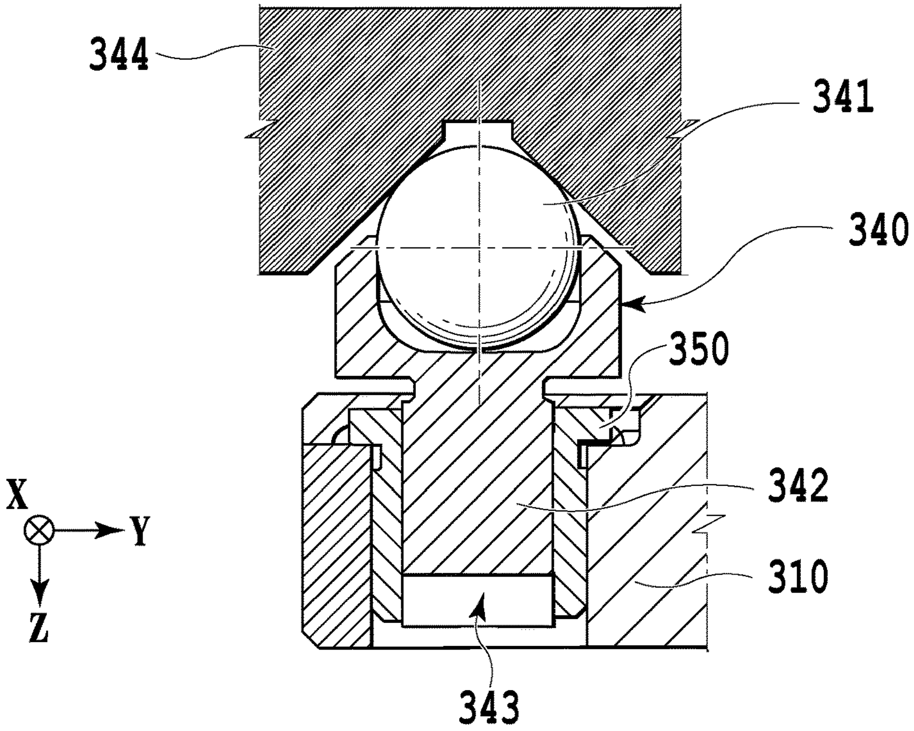
FIG. 15B is a cross-sectional view illustrating the reference member and the positioning member of the liquid ejection head.

FIG. 11 is a plan view of the liquid ejection head in which the liquid ejection unit 200 is assembled on the support unit 300 that is viewed from the ejection surface side. FIG. 12 is a cross-sectional view taken along XII-XII in FIG. 11. FIG. 13 is a cross-sectional view taken along XIII-XIII in FIG. 11. FIG. 14 is a cross-sectional view taken along XIV-XIV in FIG. 11. FIGS. 15A and 15B are cross-sectional views each illustrating the reference member 340 and a positioning member 344 of the liquid ejection head 100. FIG. 15A is a diagram illustrating a state before the reference member 340 is positioned, and FIG. 15B is a diagram illustrating a state after the reference member 340 is positioned. Note that, FIG. 13 is a cross-sectional view taken along XIII-XIII in FIG. 11 in a state where the liquid ejection unit 200 is assembled on the support unit 300 and additionally each member is assembled. As illustrated in FIGS. 12 to 14, the flow channel member 240 and the liquid supply member 330 are joined to the support member 310, and liquid flow channels are in fluid connection with each other. Around the ejection element substrate support member 230, a periphery sealing member 360 seals a space between the ejection element substrate support member 230 and the frame body member 320 to suppress entering of the liquid. A back surface (a surface on an opposite side of the ejection port surface) of the ejection element substrate support member 230 may be sealed by a back surface sealing member 370 for reinforcement. As illustrated in FIG. 11, a hole into which the reference fixation member 350 is inserted opens in each of three portions in the support member 310. A configuration in which the reference fixation member 350 is fixed into the hole, and the reference member 340 is fixed into this reference fixation member 350 is applied. The reference fixation member 350 may be a part integral with the support member 310. As illustrated in FIG. 15B, a spherical portion of a positioning unit 341 in the reference member 340 is positioned by a conical portion of the positioning member 344 of the liquid ejection apparatus 10, and thus the reference member 340 is centered at the center of the positioning member 344. The positioning can be made by putting the spherical portion of the positioning unit 341 in contact with the positioning member (predetermined portion) 344 and fixing a degree of freedom of three-direction translation (X/Y/Z direction in FIG. 15B).

It is desirable that the positioning unit 341 is substantially spherical, and the positioning can be made by putting three points on a surface of the sphere in contact with a groove or the conical portion provided on the positioning member 344 formed in the liquid ejection apparatus 10 and fixing the degree of freedom of three-direction translation (X/Y/Z direction). Additionally, in the present embodiment, a configuration in which the sphere in the reference member 340 is moved in an opposite direction of a liquid ejection direction to be put in contact with the liquid ejection head 100 is applied. With this configuration, it is easy to reduce a distance between the ejection element substrate 210 and the printing medium, and high-definition printing can be made.

Figure 16A:
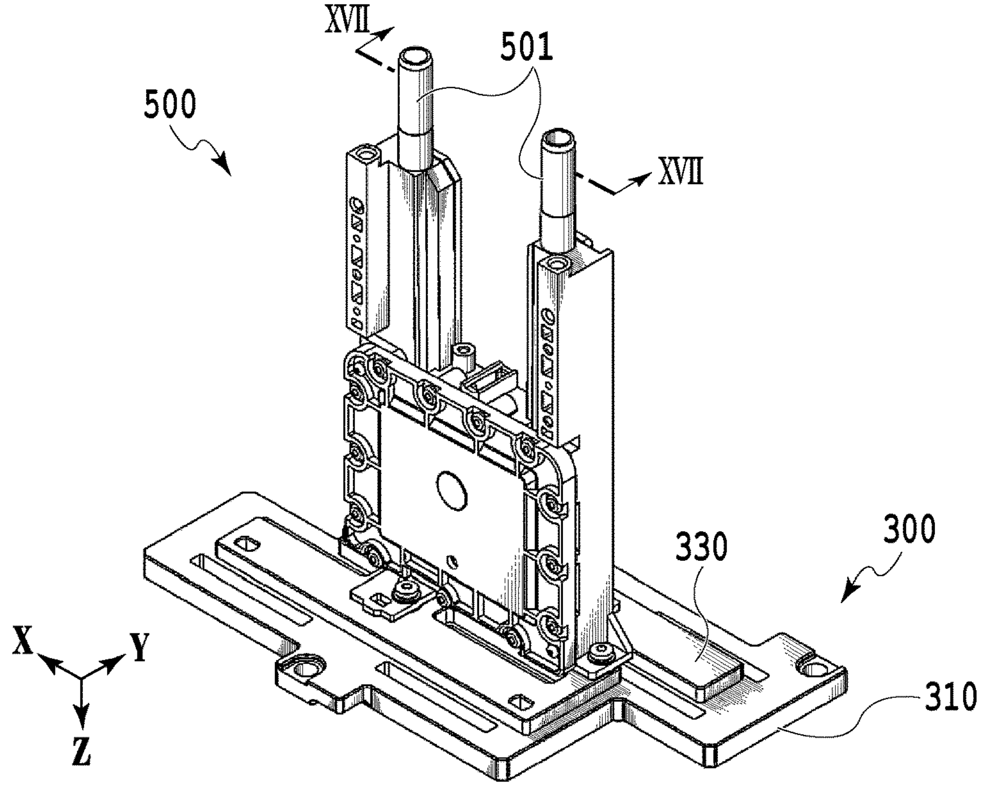
FIG. 16A is a diagram illustrating a liquid flow channel connection configuration between the support unit and a liquid supply unit.
Figure 16B:
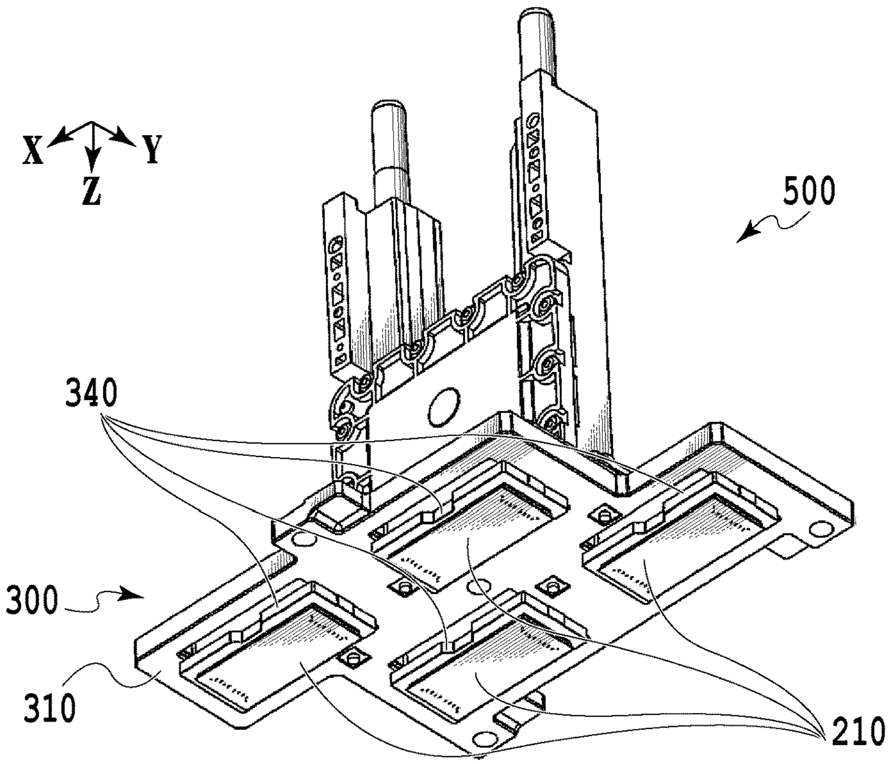
FIG. 16B is a diagram illustrating the liquid flow channel connection configuration between the support unit and the liquid supply unit.

FIGS. 16A and 16B are diagrams illustrating a liquid flow channel connection configuration between the support unit 300 and the liquid supply unit 500 of the liquid ejection head 100 according to the present embodiment. FIG. 16A is a perspective view that is viewed from above. FIG. 16B is a perspective view that is viewed from below. The liquid supply unit 500 includes the liquid connection unit 501 and is connected with the liquid supply unit 13 (FIG. 2) of the liquid ejection apparatus main body. Thus, a configuration in which the liquid is supplied from a supply system of the liquid ejection apparatus main body to the liquid ejection head 100, and additionally the liquid that passes through the liquid ejection head 100 is collected to the supply system of the liquid ejection apparatus main body is implemented. As described above, the liquid can be circulated through a path in the liquid ejection apparatus main body and a path in the liquid ejection head 100. A filter (not illustrated) communicating with each opening of the liquid connection unit 501 is provided inside the liquid supply unit 500 to remove a foreign substance in the ink to be supplied.

Figure 17:
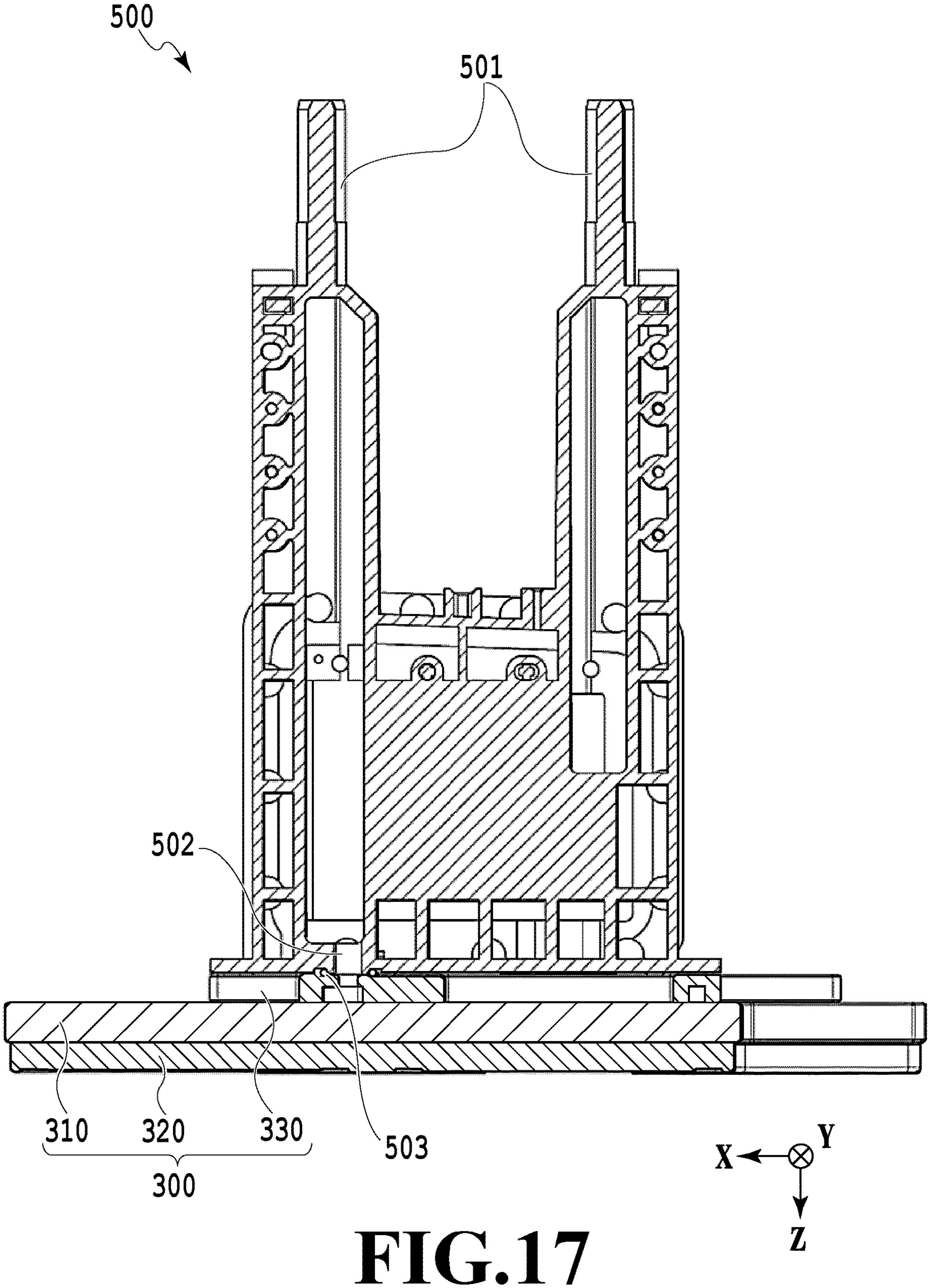
FIG. 17 is a cross-sectional view of a fluid connection unit between the liquid supply unit and a liquid supply member.

FIG. 17 is a cross-sectional view of a fluid connection unit between the liquid supply unit 500 and the liquid supply member 330. FIG. 17 is a cross-sectional view taken along XVII-XVII in FIG. 16A. The liquid that flows from the liquid ejection apparatus main body side through the liquid connection unit 501 passes through a communication port 502 and is supplied to the liquid supply member 330. An elastic member 503 is in between the liquid supply unit 500 and the liquid supply member 330 for sealing.

Figure 18:
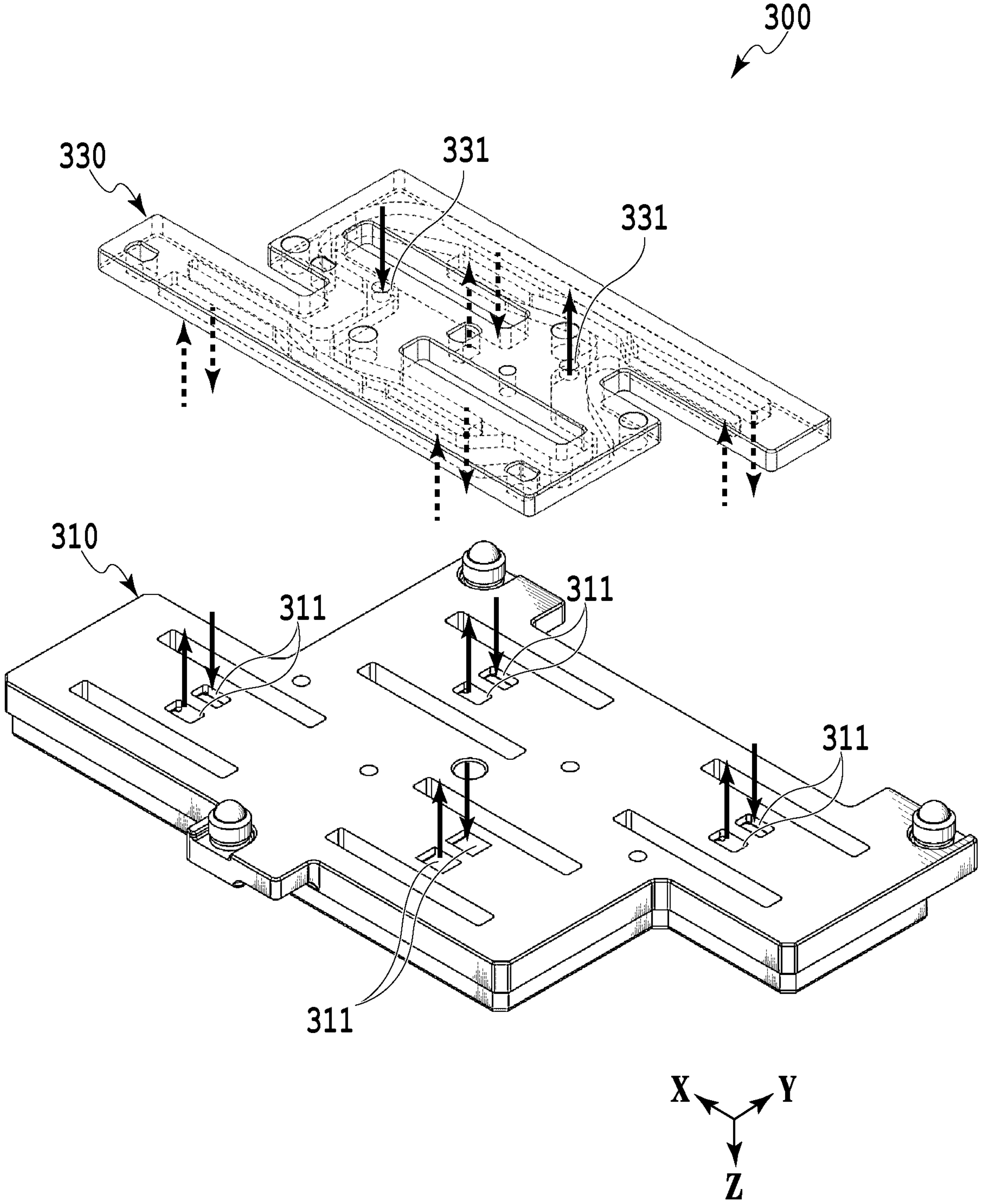
FIG. 18 is a diagram illustrating a liquid flow channel connection configuration of the support unit.
Figure 19:
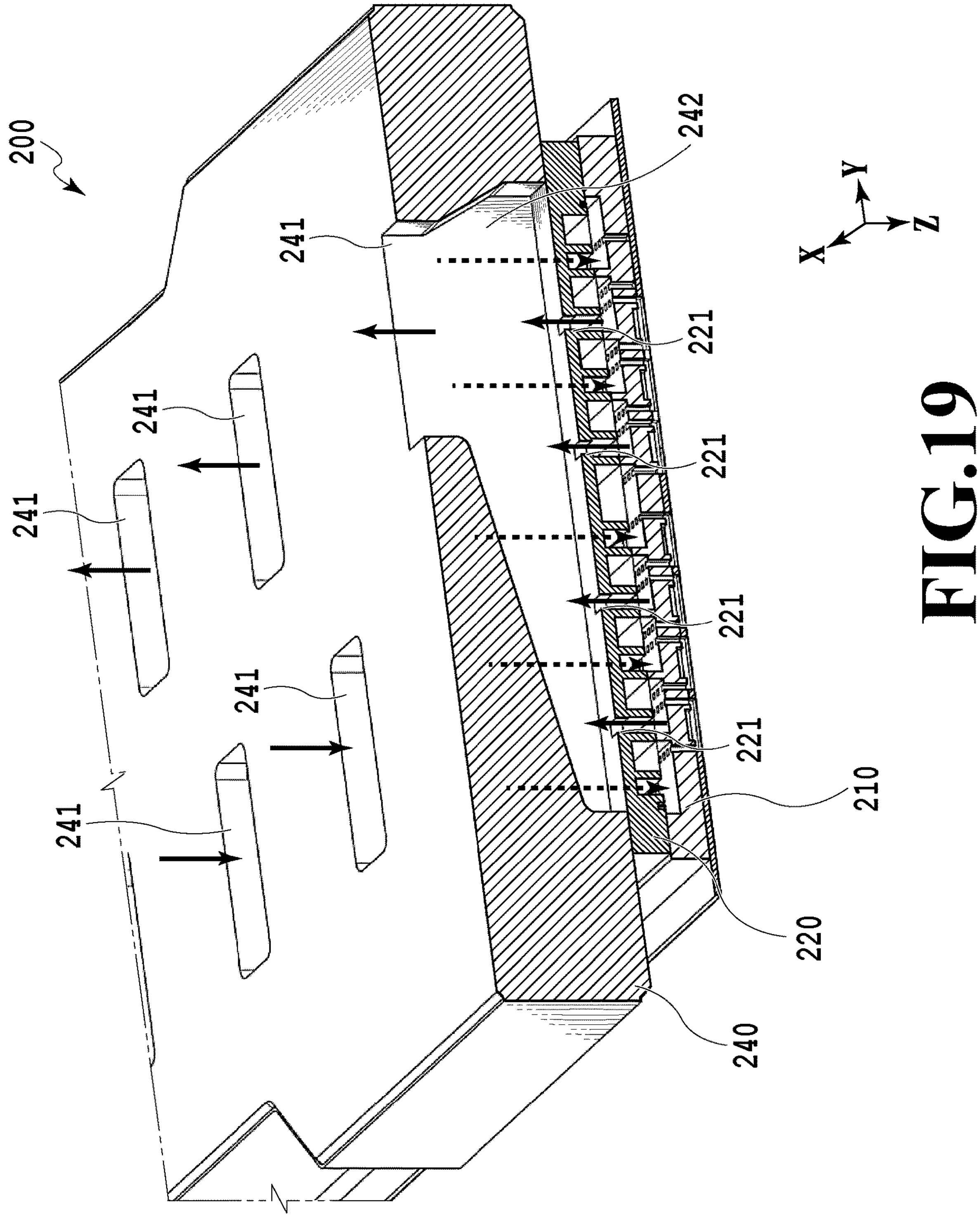
FIG. 19 is a diagram illustrating a liquid flow channel connection configuration of the liquid ejection unit.
Figure 20:
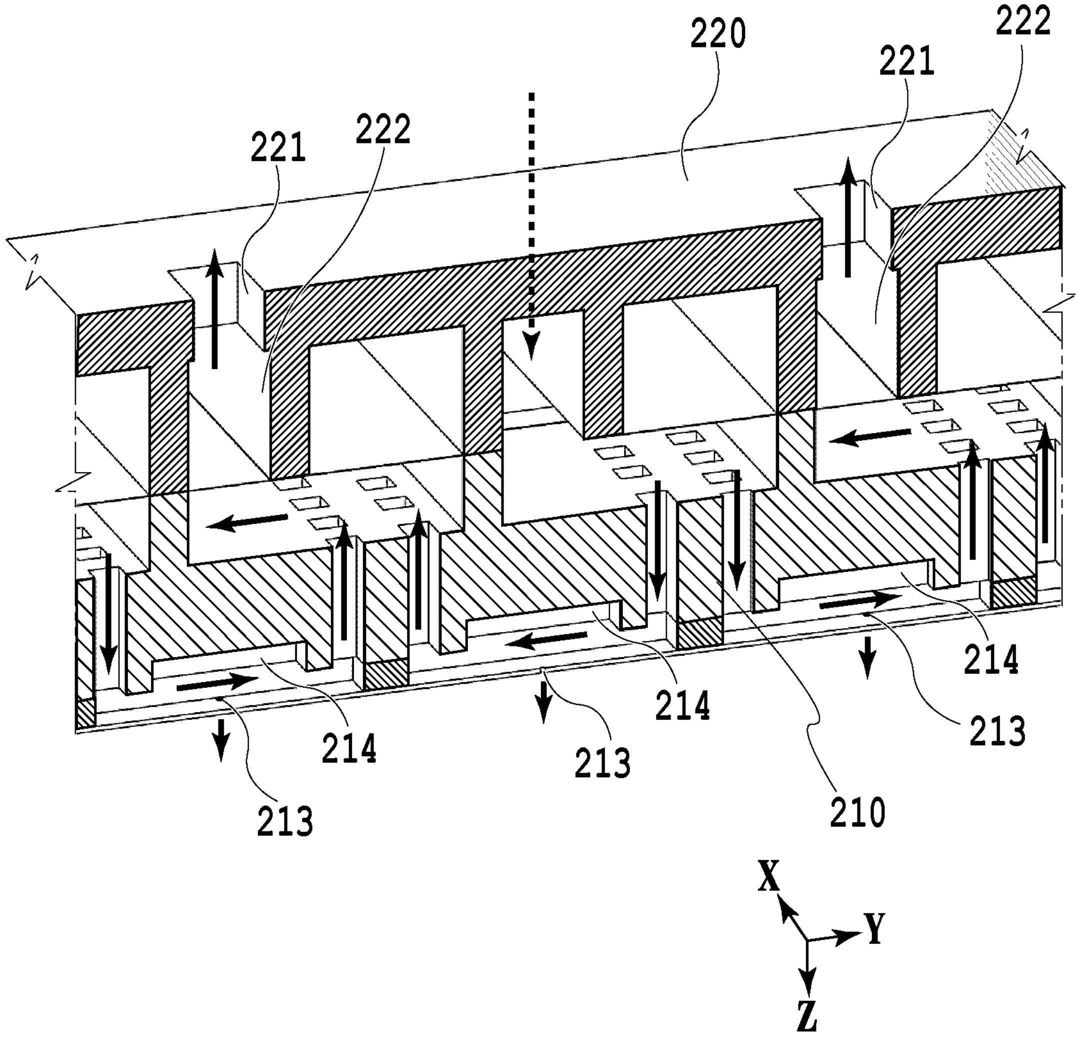
FIG. 20 is a diagram illustrating a fluid connection configuration in an ejection element substrate.

FIG. 18 is a diagram illustrating a liquid flow channel connection configuration of the support unit 300. FIG. 19 is a diagram illustrating a liquid flow channel connection configuration of the liquid ejection unit 200. The liquid supply unit 500 and the liquid supply member 330 in the support unit 300 are in fluid connection with each other through a first communication port 331. A flow channel to distribute the liquid to each liquid ejection unit 200 is formed in the liquid supply member 330. In the present example, flow channels to distribute the liquid to the four liquid ejection units 200 are formed in one liquid supply member 330. The liquid supply member 330 and the support member 310 are in fluid connection with each other through a second communication port 311. As illustrated in FIG. 19, the support member 310 and each liquid ejection unit 200 are in fluid connection with each other through a third communication port 241 in the flow channel member 240. A liquid flow channel 242 is formed in the flow channel member 240. The flow channel member 240 is in fluid connection with the ejection element substrate flow channel member 220 through a fourth communication port 221. FIG. 20 is a diagram illustrating a fluid connection configuration in the ejection element substrate 210. The liquid that flows from each fourth communication port 221 passes through a common flow channel 222 to be supplied to the ejection element substrate 210 and is ejected from an ejection port 213 by a piezoelectric element 214.

Figure 21:
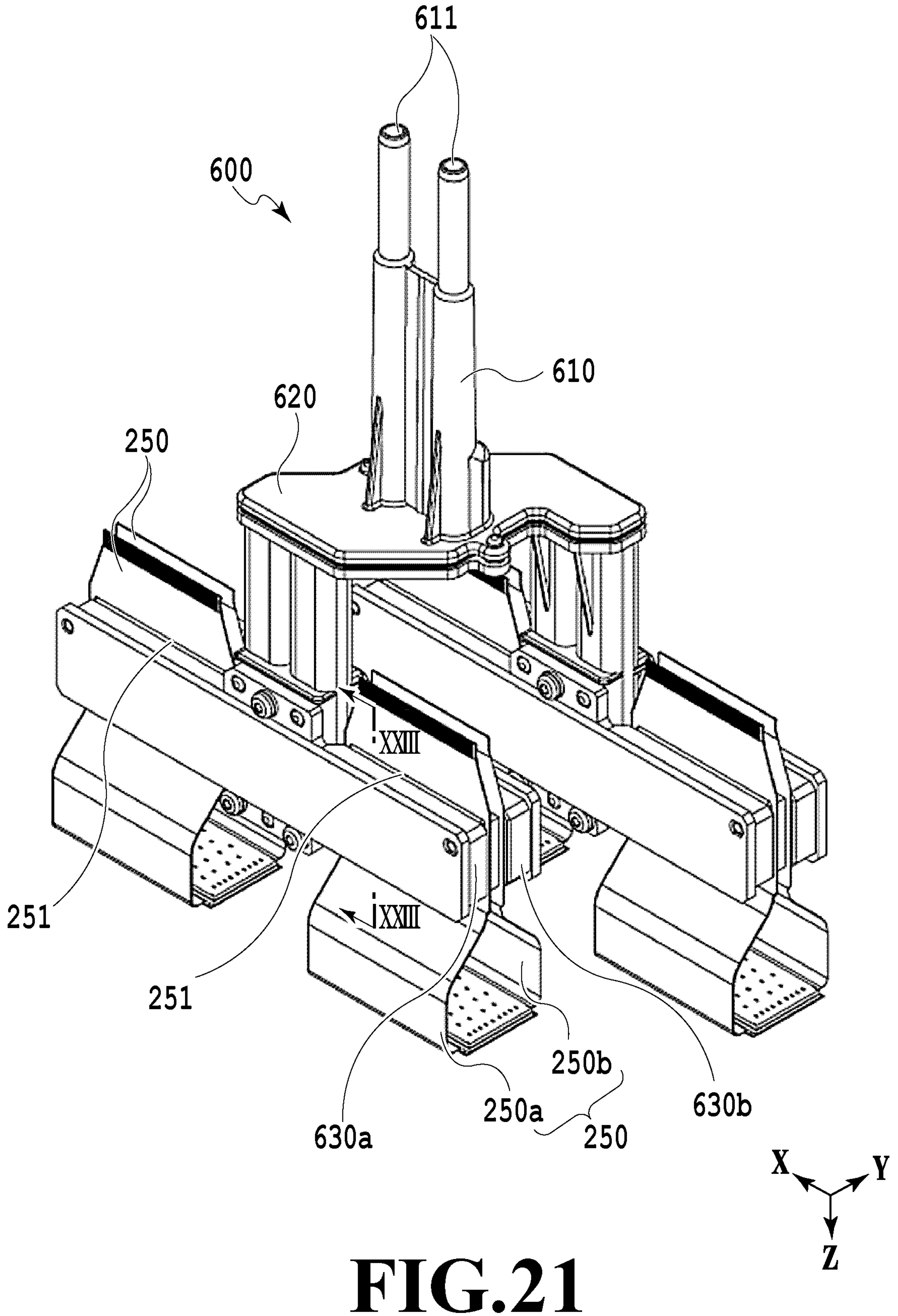
FIG. 21 is a perspective view of a cooling unit to cool down a driving circuit substrate.
Figure 22:
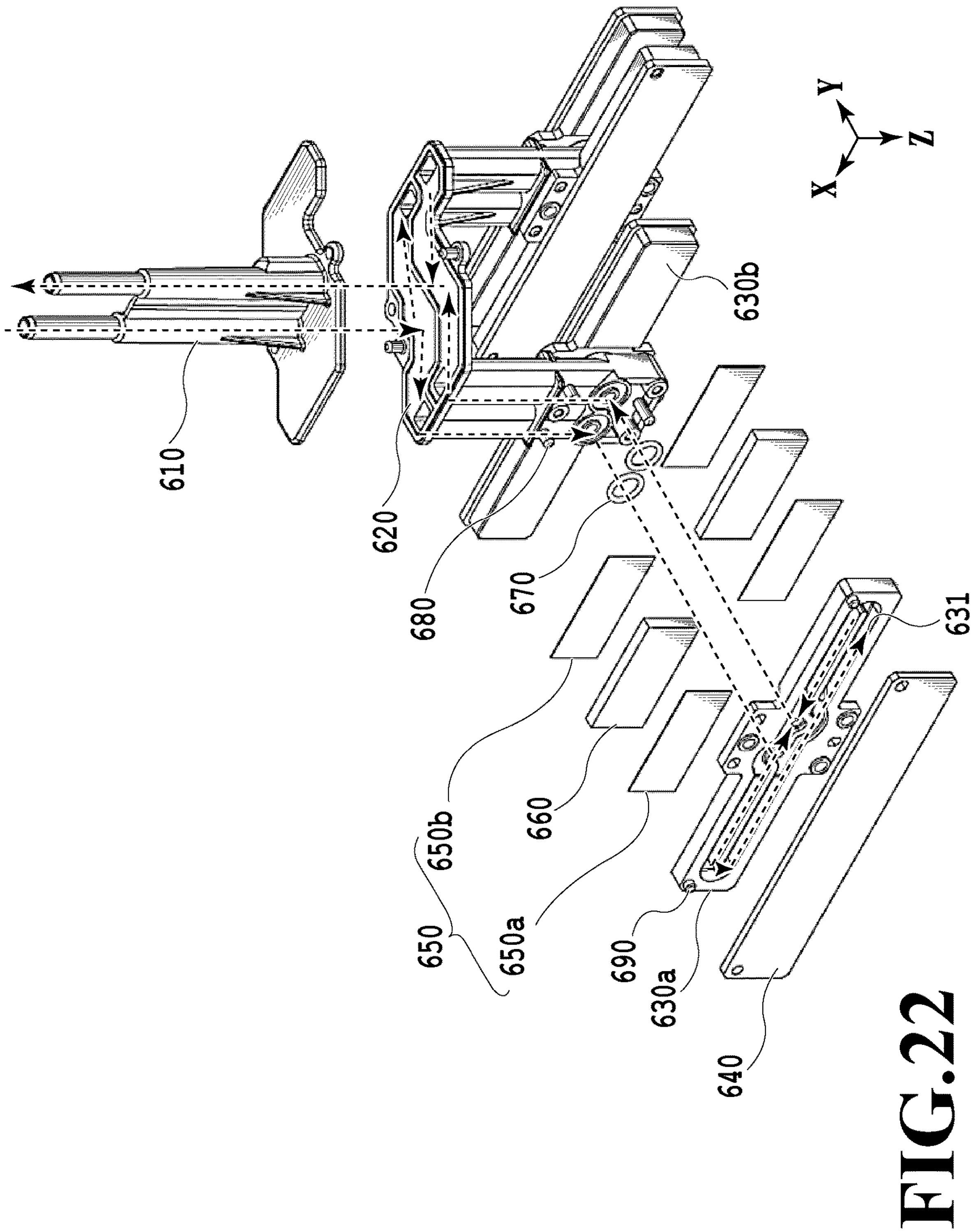
FIG. 22 is an exploded view of the cooling unit.
Figure 23:
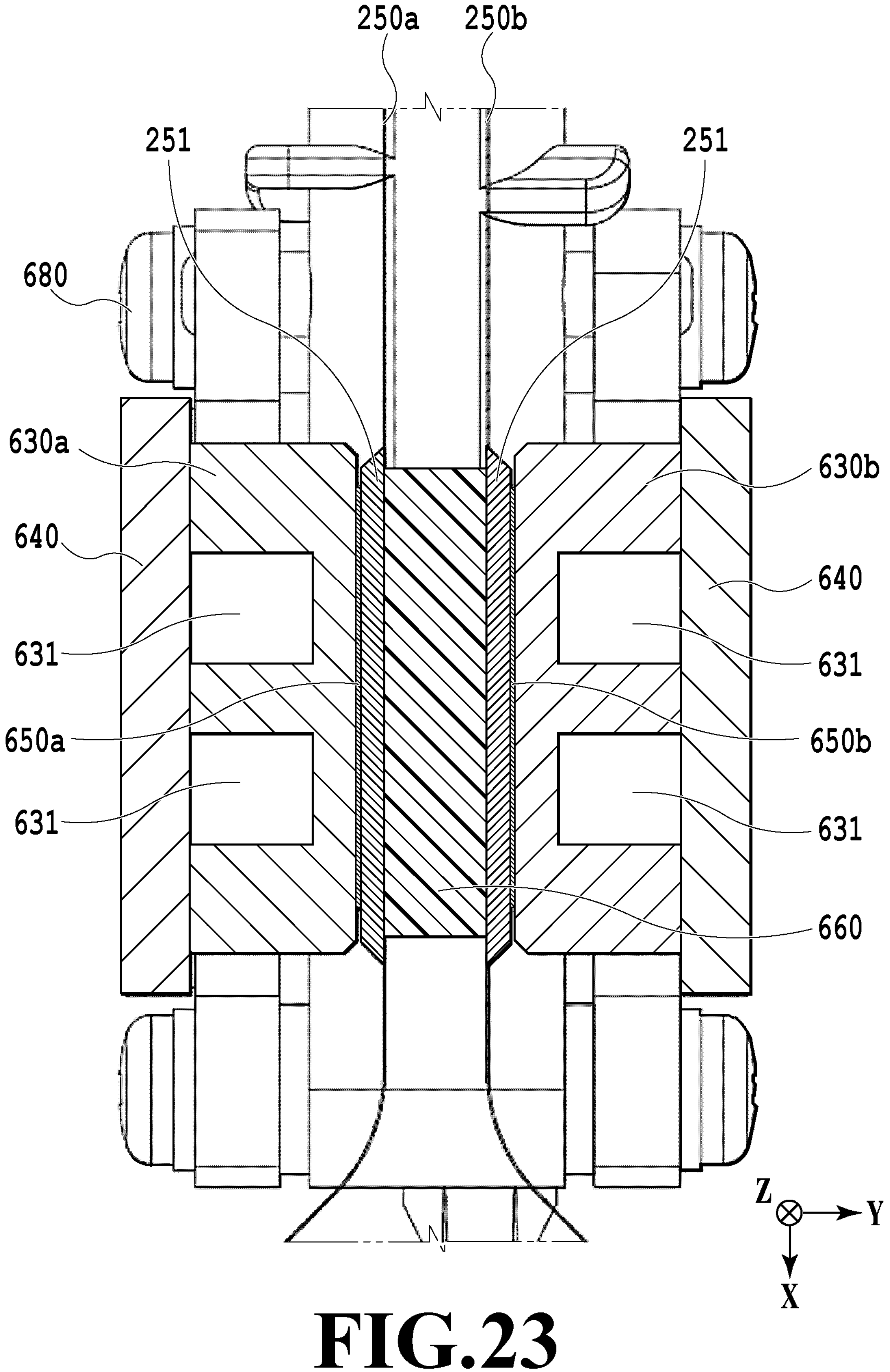
FIG. 23 is a cross-sectional view taken along XXIII-XXIII in FIG. 21.

FIG. 21 is a perspective view of the cooling unit 600 to cool down the driving circuit substrate 251. FIG. 22 is an exploded view of the cooling unit 600. FIG. 23 is a cross-sectional view taken along XXIII-XXIII in FIG. 21. As described above, the driving circuit substrate 251 is arranged on the flexible wiring substrate 250 (see FIG. 5). FIG. 21 is a diagram of a state in which the driving circuit substrate 251 is covered with the cooling unit 600. As illustrated in FIG. 21, the cooling unit 600 includes the refrigerant connection unit 611. The refrigerant connection unit 611 is connected with the refrigerant supply unit 14 (FIG. 2) of the liquid ejection apparatus main body. Thus, a configuration in which the refrigerant is supplied from a refrigerant supply system of the liquid ejection apparatus main body to the cooling unit 600, and additionally the refrigerant that passes through the cooling unit 600 is collected to the refrigerant supply system of the liquid ejection apparatus main body is implemented. As described above, the refrigerant can be circulated through a path in the liquid ejection apparatus main body and a path in the cooling unit 600. As illustrated in FIG. 22, the refrigerant that flows from the refrigerant connection unit 611 is branched in a refrigerant flow channel formed between a first refrigerant supply member 610 and a second refrigerant supply member 620. The second refrigerant supply member 620 and a cooling member 630 are in fluid connection with each other through a sealing member 670. The refrigerant branched in the second refrigerant supply member 620 is circulated in a refrigerant flow channel 631 formed between the cooling member 630 and a lid member 640. Then, the refrigerant that flows into the second refrigerant supply member 620 again converges in the refrigerant flow channel formed between the first refrigerant supply member 610 and the second refrigerant supply member 620 and flows out from the refrigerant connection unit 611. The second refrigerant supply member 620 and the cooling member 630 are fixed by a first fixation member 680. The cooling member 630 and the lid member 640 are fixed by a second fixation member 690.

The cooling unit 600 of the present embodiment includes four pairs of the cooling member 630 and the lid member 640. The second refrigerant supply member 620 is separated into two cooling systems in a Y direction. Each cooling system includes two sets of the pair of the cooling member 630 and the lid member 640. The two sets are provided so as to face each other in the Y direction. Additionally, a thermally conductive member 650 that is put in contact with the cooling member 630 is provided between the two sets in the Y direction.

Four cooling members 630 are provided in the cooling unit 600 of the present embodiment. In FIGS. 21 and 22, the cooling members 630 that are supplied with the refrigerant from the second refrigerant supply member 620 branched on a left front side of the paper surface are a first cooling member 630*a* and a second cooling member 630*b* in the order from the left front side of the paper surface. Note that, hereinafter, in a case where an individual cooling member is described, the cooling member is referred to as the first cooling member 630*a* and the second cooling member 630*b*, and in a case where a matter common to the two cooling members is described, the cooling members are simply described as the cooling member 630. Additionally, the thermally conductive member 650 that is put in contact with the first cooling member 630*a* is referred to as a first thermally conductive member 650*a*. The thermally conductive member 650 that is put in contact with the second cooling member 630*b* facing the first cooling member 630*a* is referred to as a second thermally conductive member 650*b*. Thus, the first cooling member 630*a* and the second cooling member 630*b* are arranged to face each other. As illustrated in FIG. 22, an elastic member 660 is arranged between the first thermally conductive member 650*a* and the second thermally conductive member 650*b* in the cooling unit 600. Note that, as illustrated in FIG. 21, the flexible wiring substrate 250 on which the driving circuit substrate 251 is arranged is provided between the thermally conductive member 650 and the elastic member 660, and the thermally conductive member 650 is put in contact with the driving circuit substrate 251 (see FIGS. 21 and 23). Additionally, the first cooling member 630*a* and the second cooling member 630*b* are each fixed by being pressed onto the second refrigerant supply member 620 by the first fixation member 680.

It is a configuration in which the cooling member 630 is put in contact with the driving circuit substrate 251 while the thermally conductive member 650 is sandwiched therebetween as described above, and thus the heat generated in an operation of the driving circuit substrate 251 is transferred to the refrigerant in the cooling member 630. It is preferable to select a member with a thermal conductivity as high as possible such as aluminum for example, for the cooling member 630 so as to facilitate the transference of the heat generated in the driving circuit substrate 251. The elastic member 660 is provided between the two flexible wiring substrates 250, and thus it is possible to closely put the thermally conductive member 650 in contact with the driving circuit substrate 251 reliably.

As illustrated in FIG. 21, two flexible wiring substrates 250 each including the driving circuit substrate 251 are arranged to extend from one ejection element substrate 210 in a −Z direction. The two flexible wiring substrates 250 are provided to face each other in a direction crossing the ejection port array direction in which the ejection ports 213 are formed. In more detail, the two flexible wiring substrates 250 are provided such that the driving circuit substrates 251 face outward from each other. In the flexible wiring substrate 250, the thermally conductive member 650 is put in contact with a side (an outer side) on which the driving circuit substrate 251 is arranged, and the elastic member 660 is put in contact with an opposite side (an inner side) of the side on which the driving circuit substrate 251 is arranged. Additionally, the cooling member 630 is put in contact with the driving circuit substrate 251 so as to sandwich the thermally conductive member 650 from an outer side of the thermally conductive member 650. Thus, it is possible to efficiently cool down the driving circuit substrate 251. As illustrated in FIG. 21, in the present embodiment, one cooling member (630*a* and 630*b*) is formed to cool down the driving circuit substrates 251 of the multiple ejection element substrates 210.

Figure 24A:
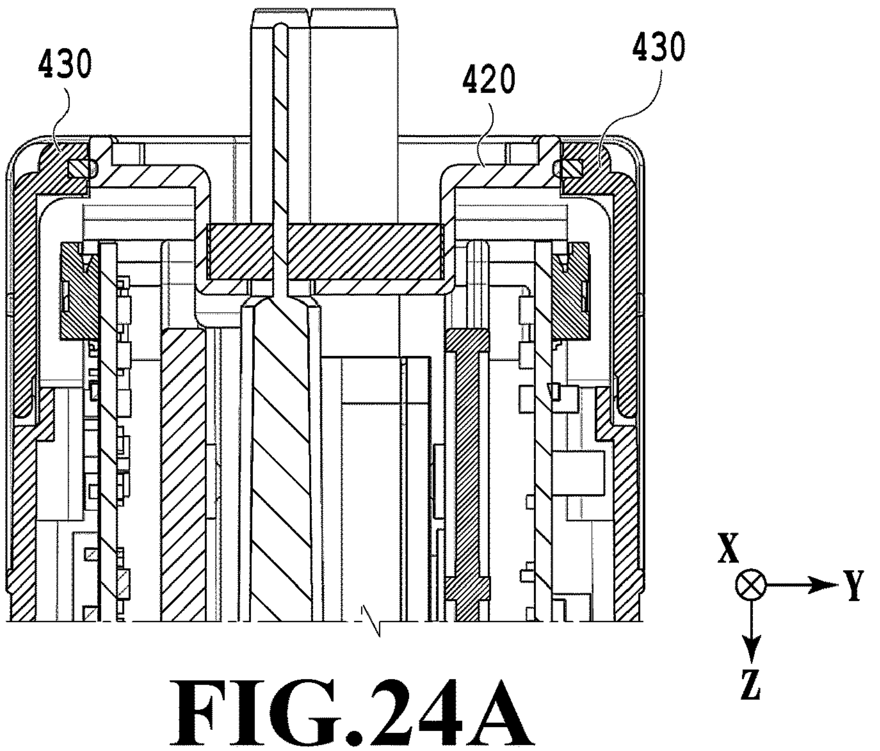
FIG. 24A is a cross-sectional view of an electric connection unit between a liquid ejection apparatus main body and the liquid ejection head.
Figure 24B:
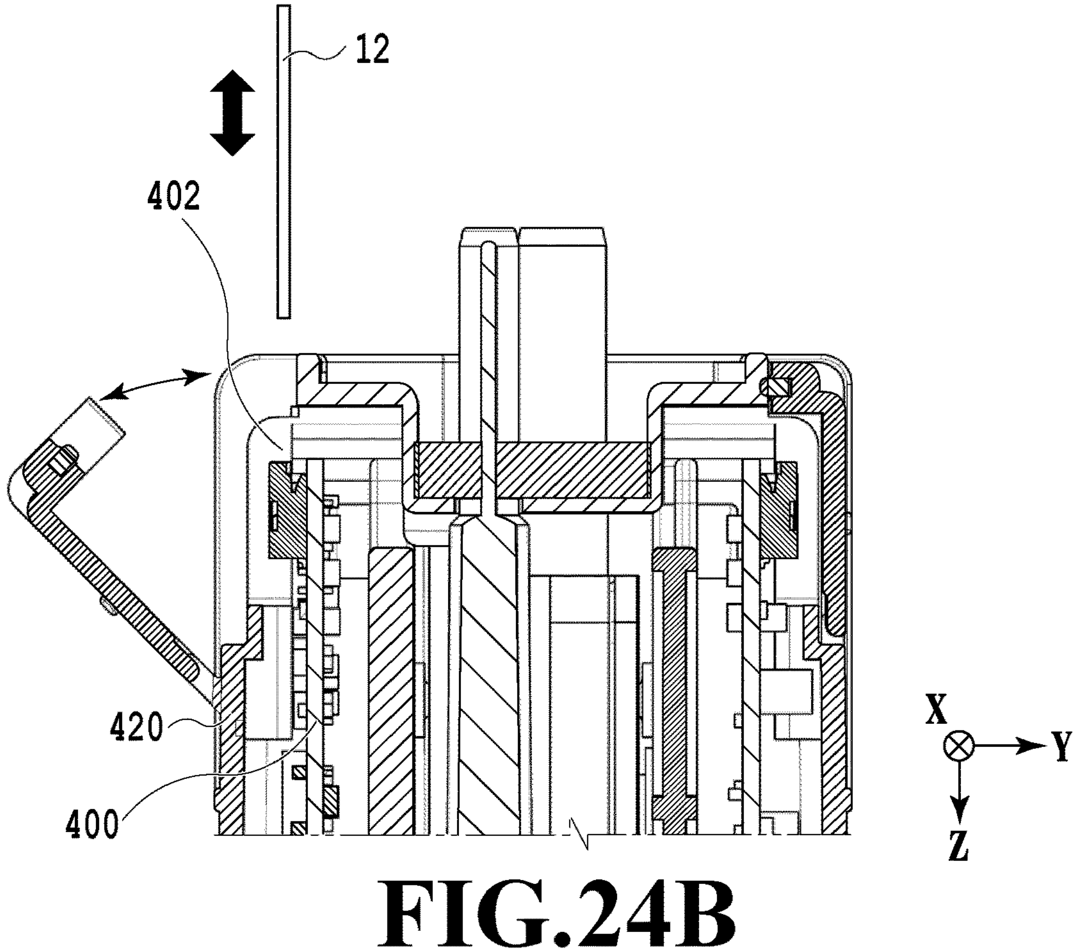
FIG. 24B is a cross-sectional view of the electric connection unit between the liquid ejection apparatus main body and the liquid ejection head.

FIGS. 24A and 24B are diagrams illustrating a cross-sectional view of an electric connection unit between the liquid ejection apparatus main body and the liquid ejection head 100. The electric wiring substrate 400 in the liquid ejection head 100 includes the electric connection terminal 402. The connection of the electric connection terminal 402 with a liquid ejection apparatus electric wiring unit 12 implements the electric connection between the liquid ejection apparatus 10 and the liquid ejection head 100. It is a configuration in which a periphery of the electric connection terminal 402 is covered with the openable and closable electric connection unit cover member 430.

Figure 25:
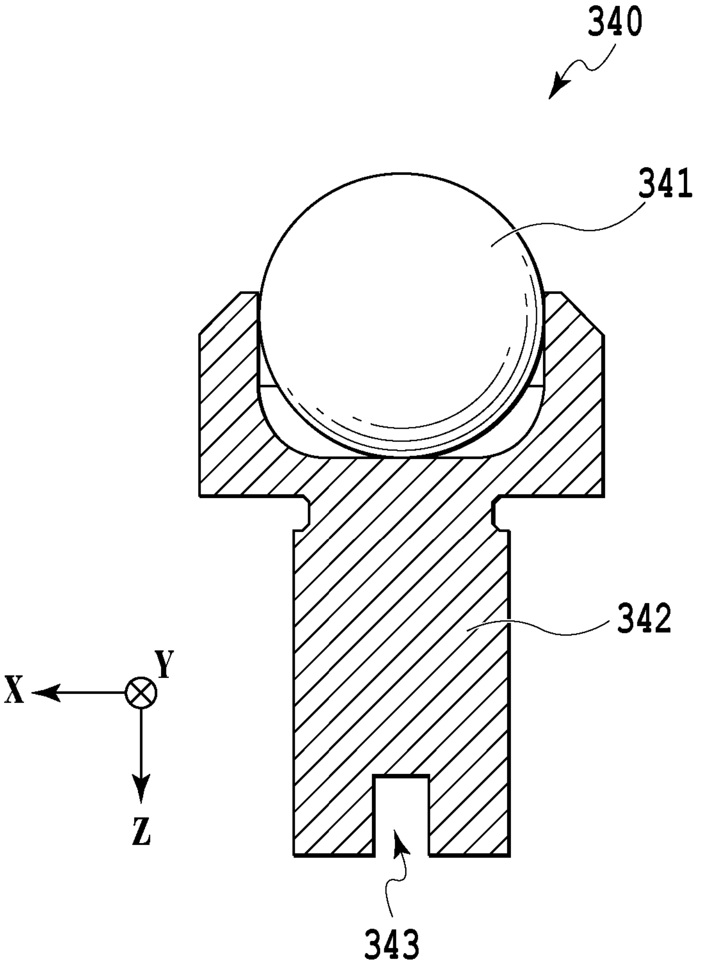
FIG. 25 is a cross-sectional view illustrating the reference member.

FIG. 25 is a cross-sectional view illustrating the reference member 340. The reference member 340 includes the positioning unit 341, an adjustment unit 342, and a recess portion 343. The positioning unit 341 is positioned by being put in contact with the positioning member 344 (see FIGS. 15A and 15B) of the liquid ejection apparatus 10. In the present embodiment, the positioning unit 341 of the reference member 340 has a sphere shape, and the positioning member 344 of the liquid ejection apparatus 10 has a recess shape. In the present embodiment, the reference member 340 and the spherical portion of the positioning unit 341 are separate members; however, they may be formed to be integral with each other.

In a case where the positioning unit 341 in the sphere shape is a separate member, press-fitting, adhering, and the like may be a method of joining. As a surface roughness of the spherical portion of the positioning unit 341 and a surface roughness of the positioning member 344 of the liquid ejection apparatus 10 are less, the sliding performance in the positioning with respect to the positioning member 344 of the liquid ejection apparatus 10 is further improved, and accurate positioning can be made. For example, it is desirable that the surface roughness of the positioning unit 341 and the positioning member 344 is Ra 0.1 μm or less. Additionally, it is preferable that the material used for the spherical portion of the positioning unit 341 is alumina and the like in order to suppress an error in the position accuracy due to linear expansion.

Moreover, the liquid ejection apparatus 10 in the present embodiment includes the adjustment unit 342 that can adjust a distance between the positioning unit 341 and the ejection element substrate 210. In the present embodiment, the adjustment unit 342 has a male thread shape while the reference fixation member 350 (see FIGS. 15A and 15B) has a female thread shape, and thus it is possible to adjust a height of the ejection element substrate 210 in the liquid ejection direction. Note that, it is not limited to the present configuration, and the relationship between the male thread and the female thread may be opposite, or the height may be adjusted by a method other than the screwing.

In the present embodiment, a configuration in which the height of the positioning unit 341 can be adjusted from a direction opposite of an insertion direction of the reference fixation member 350 into the support member 310 in the liquid ejection direction of the ejection element substrate 210 is applied. The height of the positioning unit 341 can be adjusted by adjusting the recess portion 343 of the adjustment unit 342 using a tool such as a driver or a hexagonal wrench, and the shape of the recess portion 343 may be, for example, a cross-shape hole, a hexagonal hole, or a minus groove hole. Additionally, the portion of the recess portion 343 may have a protrusion shape for the adjustment.

In the present embodiment, a configuration in which the positioning unit 341 of the reference member 340 of the liquid ejection head 100 has the sphere shape, and the positioning is made with the positioning unit 341 and the recess portion of the positioning member 344 of the liquid ejection apparatus 10 is applied. Note that, on the other hand, a configuration in which the reference member 340 of the liquid ejection head 100 has a recess shape or a groove shape, and the positioning member 344 on the liquid ejection apparatus 10 side has a sphere shape may be applied.

With the provision of the reference member 340 to the liquid ejection head 100, it is possible to reduce a distance between the liquid ejection head 100 and the printing medium 20 set in the liquid ejection apparatus 10, and as a result, it is possible to implement a size-reduction of the liquid ejection head 100.

Figure 26:
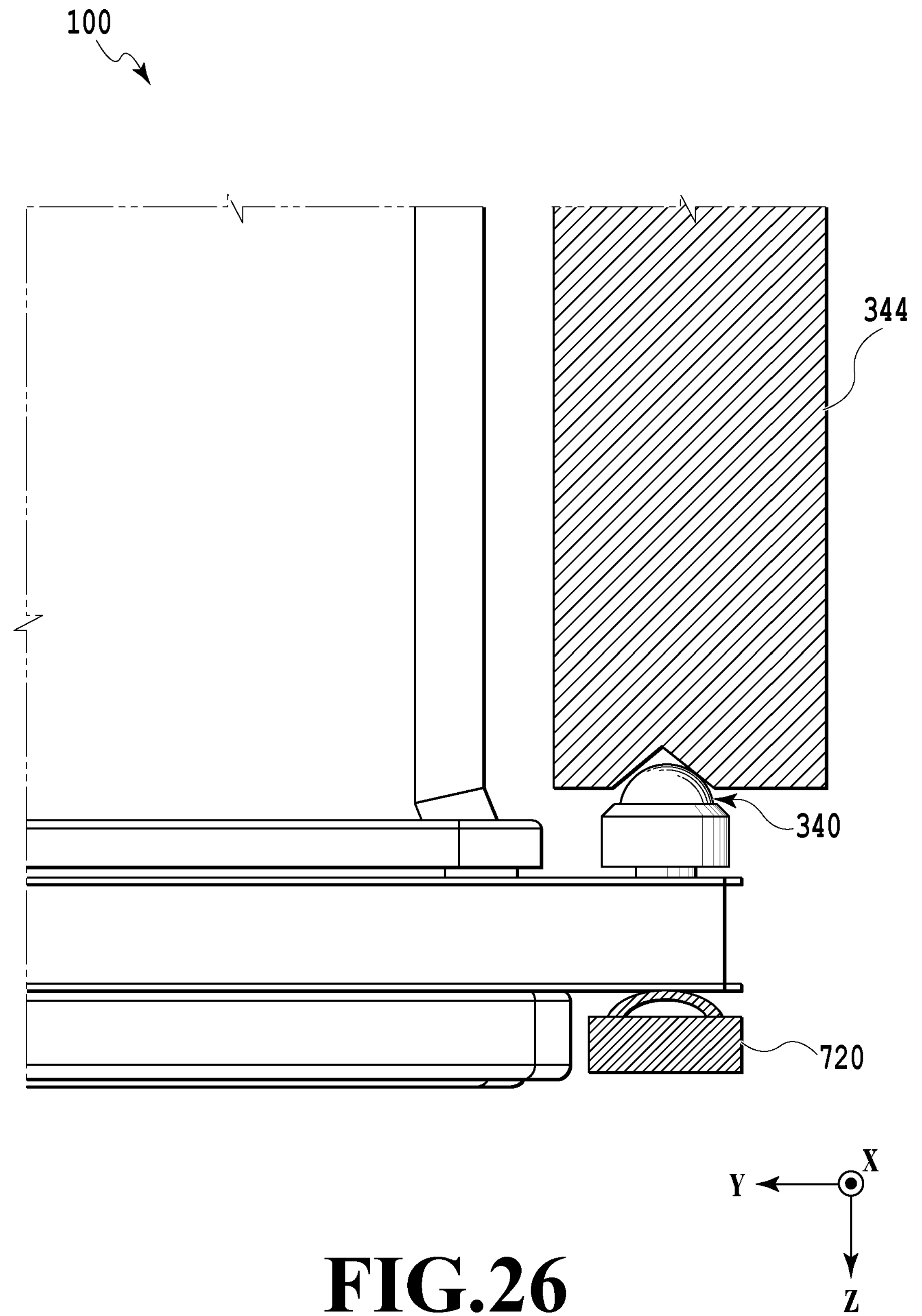
FIG. 26 is a cross-sectional view illustrating a positioning unit between the liquid ejection head and the liquid ejection apparatus.

FIG. 26 is a cross-sectional view illustrating a positioning unit between the liquid ejection head 100 and the liquid ejection apparatus 10. The recess portion to receive the reference member 340 is formed on the positioning member 344. The liquid ejection head 100 is fixed on the liquid ejection apparatus 10 by putting the liquid ejection head 100 in contact with the positioning member 344 by a pressing member 720. It is desirable that the pressing member 720 is an elastic member such as a rubber member or a spring member. In the present embodiment, the positioning unit 341 of the reference member 340 is a sphere, a groove shape or a conical shape is provided on the positioning member 344 formed in the liquid ejection apparatus 10, and the positioning unit 341 is put in contact with the positioning member 344. Thus, it is possible to position the liquid ejection head 100 simply and accurately. Note that, it is desirable that a direction of the pressing by the pressing member 720 is an axial direction including the liquid ejection direction.

Figure 27:
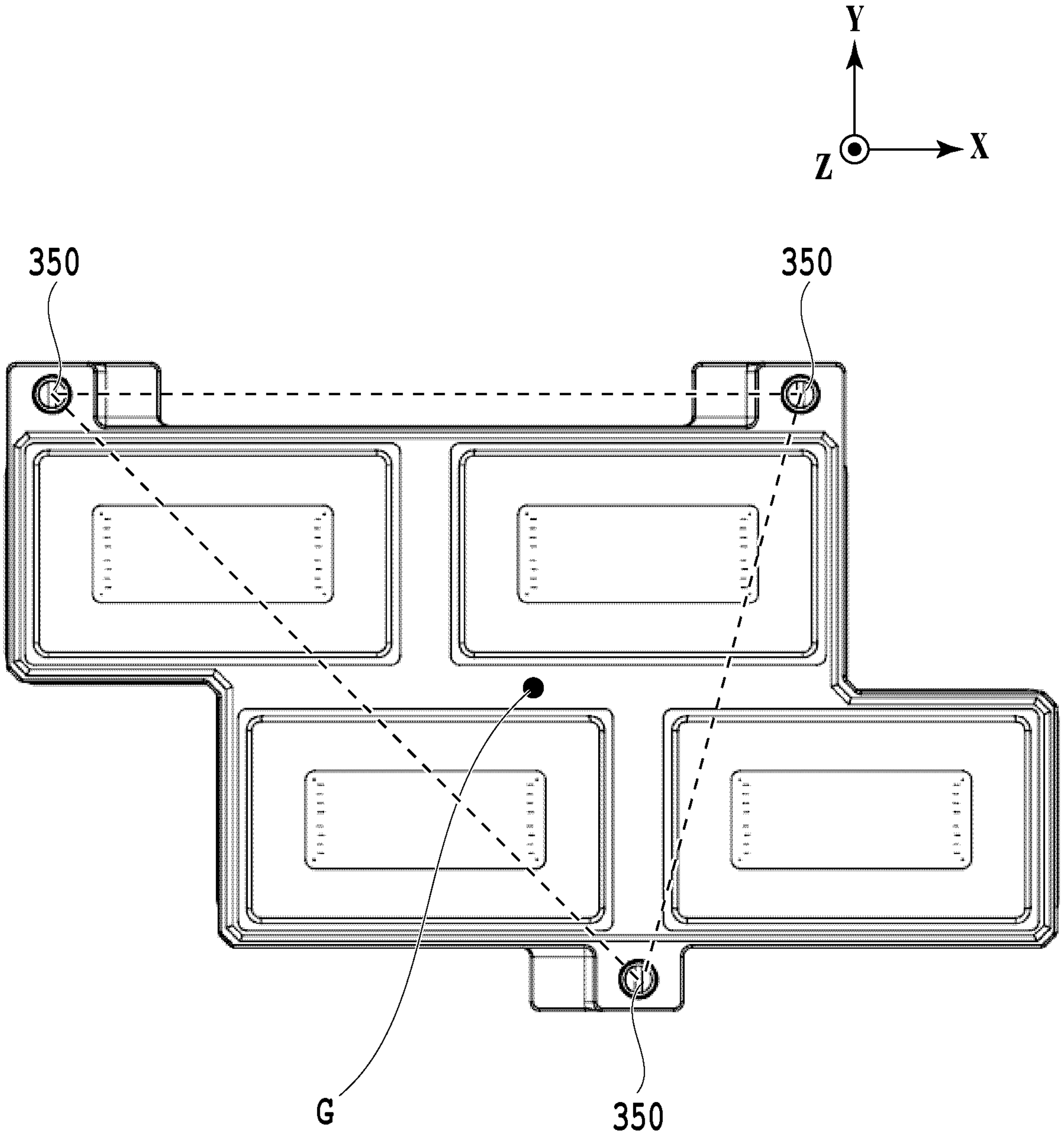
FIG. 27 is a plan view of the liquid ejection head that is viewed from a lower surface that is an ejection port surface side.
Figure 28:
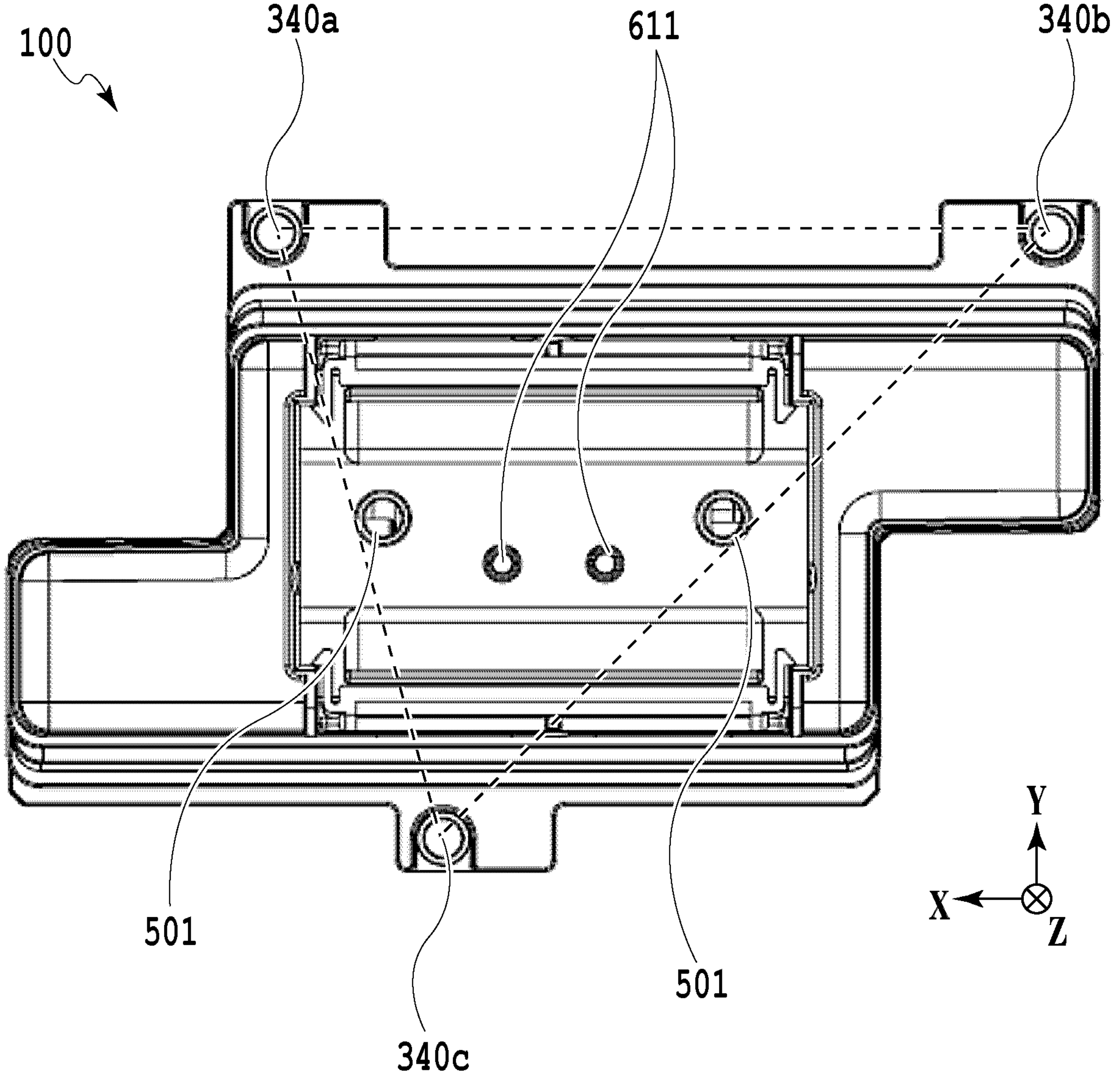
FIG. 28 is a plan view of the liquid ejection head that is viewed from above.

FIG. 27 is a plan view of the liquid ejection head 100 that is viewed from a lower surface that is an ejection port surface side, and FIG. 28 is a plan view of the liquid ejection head 100 that is viewed from above. As illustrated in FIG. 27, three reference fixation members 350 are provided to the liquid ejection head 100, and two are provided at one end portion in the Y direction while one is provided at the other end portion so as to be between, in the X direction, the two at the one portion. It has been known that supporting of an object is the most stable by supporting at three points since there is only one plane passing through three points concurrently. Accordingly, it is possible to support the liquid ejection head 100 stably by providing the three reference fixation members 350 to support the liquid ejection head 100 at three points like the present embodiment. Additionally, a configuration of the liquid ejection head 100 in which the center of gravity G of the liquid ejection head 100 is positioned inside a triangle having the three reference fixation members 350 as the apexes in a plane viewed from the ejection surface side as illustrated in FIG. 27 is desirable since the stability in the fixation is likely to be secured.

Additionally, as illustrated in FIG. 28, the reference member 340 is a first reference member 340*a*, a second reference member 340*b*, and a third reference member 340*c* in each of reference positions in the liquid ejection head 100. Moreover, the liquid connection unit 501 and the refrigerant connection unit 611 are arranged to be positioned within the triangle formed by the three reference members 340 in the plane viewed from above the liquid ejection head 100. With this arrangement, it is possible to secure the stability of the connection unit and the reference unit.

As described above, at least two reference members are arranged at the one end portion in the Y direction crossing the X direction, and at least one reference member is provided at the other end portion so as to be between, in the X direction, the two reference members on the one side. Additionally, the reference member includes the adjustment unit, and the adjustment unit can adjust the position of the ejection element substrate in the liquid ejection direction. This makes it possible to provide a liquid ejection head and a liquid ejection apparatus that can suppress a deterioration of the printing quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207206 filed Dec. 23, 2022, which is hereby incorporated by reference herein in its entirety.

What is claimed is:

1. A liquid ejection head comprising:

an ejection element substrate in which a plurality of ejection ports ejecting a liquid are formed as an array in a first direction;

a support member configured to support the ejection element substrate; and reference members attached to the support member, each of the reference members being configured to perform positioning of the ejection element substrate by putting a positioning unit in contact with a predetermined portion, wherein the reference members comprise a first reference member and a second reference member that are provided at one end portion in a second direction crossing the first direction so as to be in different positions in the first direction, and a third reference member that is provided at the other end portion in the second direction so as to be between, in the first direction, the first reference member and the second reference member, and at least one of the reference members includes an adjustment unit, and the at least one adjustment unit can adjust a position of the ejection element substrate in a liquid ejection direction.

2. The liquid ejection head according to claim 1, wherein the positioning unit comprises a substantially spherical portion.

3. The liquid ejection head according to claim 2, wherein the spherical portion of the positioning unit is formed of alumina.

4. The liquid ejection head according to claim 1, wherein the center of gravity in a surface in which the ejection ports are formed is within a triangle having three of the reference members as apexes.

5. The liquid ejection head according to claim 1, wherein the support member supports a plurality of the ejection element substrates, the ejection element substrates are arrayed in the first direction and arranged in the second direction, and one of the ejection element substrates arranged in the second direction is arranged to be overlapped in the second direction with two of the ejection element substrates arrayed in the first direction.

6. The liquid ejection head according to claim 1, wherein the at least one adjustment unit adjusts the position of the ejection element substrate with a screw.

7. The liquid ejection head according to claim 6, wherein a recess portion is provided on an opposite side of the positioning unit in the at least one adjustment unit.

8. The liquid ejection head according to claim 7, wherein the recess portion includes any one of a cross-shape hole, a hexagonal hole, and a minus groove hole.

9. The liquid ejection head according to claim 1, wherein the positioning unit and the at least one adjustment unit are formed as separate members.

10. The liquid ejection head according to claim 1, wherein the positioning unit and the at least one adjustment unit are formed to be integral with each other.

11. The liquid ejection head according to claim 1, wherein the positioning unit is put in contact with the predetermined portion by being pressed in an axial direction including a liquid ejection direction.

12. A liquid ejection apparatus in which a liquid ejection head can be mounted, the liquid ejection head comprising:

an ejection element substrate in which a plurality of ejection ports ejecting a liquid are formed as an array in a first direction;

a support member configured to support the ejection element substrate; and reference members attached to the support member, each of the reference members being configured to perform positioning of the ejection element substrate by putting a positioning unit in contact with a predetermined portion, wherein the reference members comprise a first reference member and a second reference member that are provided at one end portion in a second direction crossing the first direction so as to be in different positions in the first direction, and a third reference member that is provided at the other end portion in the second direction so as to be between, in the first direction, the first reference member and the second reference member, and at least one of the reference members includes an adjustment unit, and the at least one adjustment unit can adjust a position of the ejection element substrate in a liquid ejection direction.

* * * * *